(12) United States Patent
Vanderwees et al.

(10) Patent No.: US 9,735,438 B2
(45) Date of Patent: Aug. 15, 2017

(54) HUMIDIFIER FOR FUEL CELL SYSTEMS

(71) Applicant: Dana Canada Corporation, Oakville (CA)

(72) Inventors: Doug Vanderwees, Mississauga (CA); Colin Arthur Shore, Hamilton (CA)

(73) Assignee: Dana Canada Corporation, Oakville, Ontario (CA)

( * ) Notice: Subject to any disclaimer, the term of this patent is extended or adjusted under 35 U.S.C. 154(b) by 258 days.

(21) Appl. No.: 14/583,915

(22) Filed: Dec. 29, 2014

(65) Prior Publication Data

US 2015/0180059 A1   Jun. 25, 2015

Related U.S. Application Data

(63) Continuation-in-part of application No. 13/225,877, filed on Sep. 6, 2011, now Pat. No. 8,919,746.
(Continued)

(51) Int. Cl.
*B01F 3/04* (2006.01)
*H01M 8/04119* (2016.01)
(Continued)

(52) U.S. Cl.
CPC ...... *H01M 8/04141* (2013.01); *B01D 63/085* (2013.01); *B01D 65/003* (2013.01);
(Continued)

(58) Field of Classification Search
CPC .... B01D 63/085; B01D 65/003; B01D 69/06; B01D 69/10; B01D 2313/04;
(Continued)

(56) References Cited

U.S. PATENT DOCUMENTS 5,829,517 A   11/1998   Schmid et al.
6,071,635 A    6/2000   Carlstrom
(Continued)

FOREIGN PATENT DOCUMENTS

CA   2657873      9/2009
CN   101409352 A  4/2009
(Continued)

OTHER PUBLICATIONS

English Language Abstract of JP 2003-314983, Nov. 2003.
(Continued)

*Primary Examiner* — Charles Bushey
(74) *Attorney, Agent, or Firm* — Marshall & Melhorn, LLC

(57) ABSTRACT

A humidifier for transferring water vapour from a first gas stream to a second gas stream in a fuel cell system comprises a stack of thin plates having planar sealing surfaces at their edges, along which they are sealed together. A water permeable membranes is provided between each pair of plates in the stack. Each plate defines a gas flow passage along its top and bottom surfaces, with an inlet and outlet defined along edges of the plate, and a flow field extending between the inlet and outlet openings. Inlet and outlet passages connect the inlet and outlet openings to the flow field, and the planar sealing surfaces on both sides of the plate include bridging portions which extend across the inlet and outlet passages. Support structures such as ribs are provided throughout the flow field and the inlet and outlet passages to support the membrane and diffusion medium layer(s). The support structures may optionally be connected together by webs, and the webs are provided with holes to permit flow distribution between the top and bottom of each plate.

18 Claims, 30 Drawing Sheets

Related U.S. Application Data

(60) Provisional application No. 61/432,429, filed on Jan. 13, 2011.

(51) Int. Cl.
    *B01D 63/08*     (2006.01)
    *B01D 65/00*     (2006.01)
    *B01D 69/06*     (2006.01)
    *B01D 69/10*     (2006.01)
    *H01M 8/04007*     (2016.01)
    *F24F 3/14*     (2006.01)

(52) U.S. Cl.
    CPC ............ *B01D 69/06* (2013.01); *B01D 69/10* (2013.01); *H01M 8/04074* (2013.01); *H01M 8/04149* (2013.01); *B01D 2313/04* (2013.01); *B01D 2313/105* (2013.01); *B01D 2319/02* (2013.01); *F24F 2003/1435* (2013.01)

(58) Field of Classification Search
    CPC ........... B01D 2313/105; B01D 2319/02; F24F 2003/1435; H01M 8/04141; H01M 8/04074; H01M 8/04149
    USPC .............................. 261/102, 104, 105, 107
    See application file for complete search history.

(56) References Cited

U.S. PATENT DOCUMENTS

| | | | |
|---|---|---|---|
| 6,106,964 | A | 8/2000 | Voss et al. |
| 6,332,913 | B1 | 12/2001 | Breitschwerdt et al. |
| 6,376,111 | B1 | 4/2002 | Mathias et al. |
| 6,416,895 | B1 | 7/2002 | Voss et al. |
| 6,500,573 | B1 | 12/2002 | Simazu et al. |
| 6,524,733 | B1 | 2/2003 | Nonobe |
| 6,531,236 | B1 * | 3/2003 | Hatoh .................. H01M 8/0213 429/454 |
| 6,666,909 | B1 | 12/2003 | TeGrotenhuis et al. |
| 6,783,878 | B2 | 8/2004 | Voss et al. |
| 6,844,095 | B2 | 1/2005 | Lim et al. |
| 6,864,005 | B2 | 3/2005 | Mossman |
| 6,924,051 | B2 | 8/2005 | Meissner et al. |
| 6,953,635 | B2 | 10/2005 | Suzuki et al. |
| 7,040,606 | B2 | 5/2006 | Okada |
| 7,078,117 | B2 | 7/2006 | Mossman |
| 7,210,220 | B2 * | 5/2007 | Frank ........................ C25B 9/18 29/730 |
| 7,258,329 | B2 | 8/2007 | Sasamoto |
| 7,311,760 | B2 | 12/2007 | Matsumura et al. |
| 7,404,848 | B2 | 7/2008 | Okada et al. |
| 7,413,821 | B2 | 8/2008 | Sugiura et al. |
| 7,479,341 | B2 | 1/2009 | Takeguchi et al. |
| 7,585,355 | B2 | 9/2009 | Gonjo et al. |
| 7,717,404 | B2 | 5/2010 | Hasegawa et al. |
| 7,749,661 | B2 | 7/2010 | Zhang et al. |
| 7,784,770 | B2 | 8/2010 | Mossman |
| 7,833,673 | B2 | 11/2010 | Morimoto et al. |
| 7,838,172 | B2 | 11/2010 | Wada et al. |
| 7,851,080 | B2 | 12/2010 | Weber et al. |
| 7,875,396 | B2 | 1/2011 | Zhang et al. |
| 7,972,732 | B2 | 7/2011 | MacKinnon et al. |
| 7,985,279 | B2 | 7/2011 | Kondo et al. |
| 8,048,585 | B2 | 11/2011 | Skala |
| 8,058,352 | B2 | 11/2011 | MacKinnon et al. |
| 8,137,853 | B2 | 3/2012 | Zhang et al. |
| 8,329,347 | B2 | 12/2012 | Rock et al. |
| 8,919,746 | B2 * | 12/2014 | Vanderwees ...... H01M 8/04074 261/102 |
| 2005/0064263 | A1 | 3/2005 | Goebel et al. |
| 2005/0275120 | A1 | 12/2005 | Sasamoto |
| 2006/0172177 | A1 | 8/2006 | Scherer et al. |
| 2006/0263654 | A1 | 11/2006 | Goebel et al. |
| 2007/0190392 | A1 | 8/2007 | Kim et al. |
| 2008/0085437 | A1 | 4/2008 | Dean et al. |
| 2008/0131745 | A1 | 6/2008 | Ikeda et al. |
| 2009/0092863 | A1 | 4/2009 | Skala |
| 2009/0239112 | A1 | 9/2009 | Vanderwees |
| 2010/0019400 | A1 | 1/2010 | Robb et al. |
| 2011/0053008 | A1 | 3/2011 | Brenner et al. |
| 2011/0053009 | A1 | 3/2011 | Brenner et al. |
| 2011/0129740 | A1 | 6/2011 | Koo |
| 2012/0214082 | A1 | 8/2012 | Takeuchi et al. |
| 2012/0217661 | A1 | 8/2012 | Brenner et al. |
| 2013/0101909 | A1 | 4/2013 | Fasold et al. |

FOREIGN PATENT DOCUMENTS

| | | |
|---|---|---|
| CN | 101510619 A | 8/2009 |
| CN | 101577342 A | 11/2009 |
| DE | 10217712 | 11/2003 |
| DE | 10245202 | 4/2004 |
| DE | 202011109654 | 2/2013 |
| DE | 202012004927 | 10/2013 |
| DE | 102013208877 | 11/2013 |
| JP | 2000243418 A | 9/2000 |
| JP | 2002025592 A | 1/2002 |
| JP | 2002170584 A | 6/2002 |
| JP | 203314983 | 11/2003 |
| JP | 2005226945 A | 8/2005 |
| JP | 2006156099 A | 6/2006 |
| JP | 2010276322 A | 12/2010 |
| WO | WO2013092630 | 6/2013 |

OTHER PUBLICATIONS

English Machine Translation of JP 2003-314983, Mar. 2015.
English Machine Translation of DE202011109654U1, published Feb. 28, 2013, applicant Reinz-Dichtungs-GmbH.
English Machine Translation of DE102013208877 A1, published Nov. 21, 2013, applicant Reinz-Dichtungs-GmbH.
English Machine Translation of DE202012004927 U1, published Oct. 10, 2013, applicant Reinz-Dichtungs-GmbH.
International Search Report and Written Opinion for corresponding PCT Application No. PCT/CA2012/050023, Mar. 2012.
English Language Abstract of DE10245202A1, Mar. 2015.
English Language Abstract of DE10217712A1, Mar. 2015.
Machine-generated English Translation of CN101409352A, obtained via Espacenet Patent Search (URL: http://worldwide.espacenet.com/?locale=en_EP), Apr. 2016.
Machine-generated English Translation of CN101510619A, obtained via Espacenet Patent Search (URL: http://worldwide.espacenet.com,/?locale=en_EP), Apr. 2016.
Machine-generated English Translation of CN101577342A, obtained via Espacenet Patent Search (URL: http://worldwide.espacenet.com/?locale=en_EP), Apr. 2016.
Machine-generated English Translation of JP2000243418A, obtained via the J-Piat Pat (Japan Platform for Patent Information) website (URL: https://www4.j-platpat.inpit.go.jp/eng/tokujitsu/tkbs_en/TKBS_EN_GM101_Top.action) and via Espacenet Patent Search (URL: http://worldwide.espacenet.com/?locale=en_EP), Apr. 2016.
Machine-generated English Translation of JP2002025592A, obtained via the J-Piat Pat (Japan Platform for Patent Information) website (URL: https://www4.j-platpat.inpit.go.jp/eng/tokujitsu/tkbs_en/TKBS_EN_GM101_Top.action) and via Espacenet Patent Search (URL: http://worldwide.espacenet.com/?locale=en_EP), Apr. 2016.
Machine-generated English Translation of JP2002170584A, obtained via the J-Piat Pat (Japan Platform for Patent Information) website (URL: https://www4.j-platpat.inpit.go.jp/eng/tokujitsu/tkbs_en/TKBS_EN_GM101_Top.action) and via Espacenet Patent Search (URL: http://worldwide.espacenet.com/?locale=en_EP), Apr. 2016.
Machine-generated English Translation of JP2005226945A, obtained via the J-Piat Pat (Japan Platform for Patent Information) website (URL: https://www4.j-platpat.inpit.go.jp/eng/tokujitsu/tkbs_en/TKBS_EN_GM101_Top.action) and via Espacenet Patent Search (URL: http://wordwide.espacenet.com/?locale=en_EP), Apr. 2016.

(56) References Cited

OTHER PUBLICATIONS

Machine-generated English Translation of JP2006156099A, obtained via the J-Piat Pat (Japan Platform for Patent Information) website (URL: https://www4.j-platpat.inpit.go.jp/eng/tokujitsu/tkbs_en/TKBS_EN_GM101_Top.action) and via Espacenet Patent Search (URL: http://worldwide.espacenet.com/?locale=en_EP), Apr. 2016.

Machine-generated English Translation of JP2010276322A, obtained via the J-Piat Pat (Japan Platform for Patent Information) website (URL: https://www4.j-platpal.inpit.go.jp/eng/tokujitsu/tkbs_en/TKBS_EN_GM101_Top.action) and via Espacenet Patent Search (URL: http://worldwide.espacenet.com/?locale=en_EP), Apr. 2016.

* cited by examiner

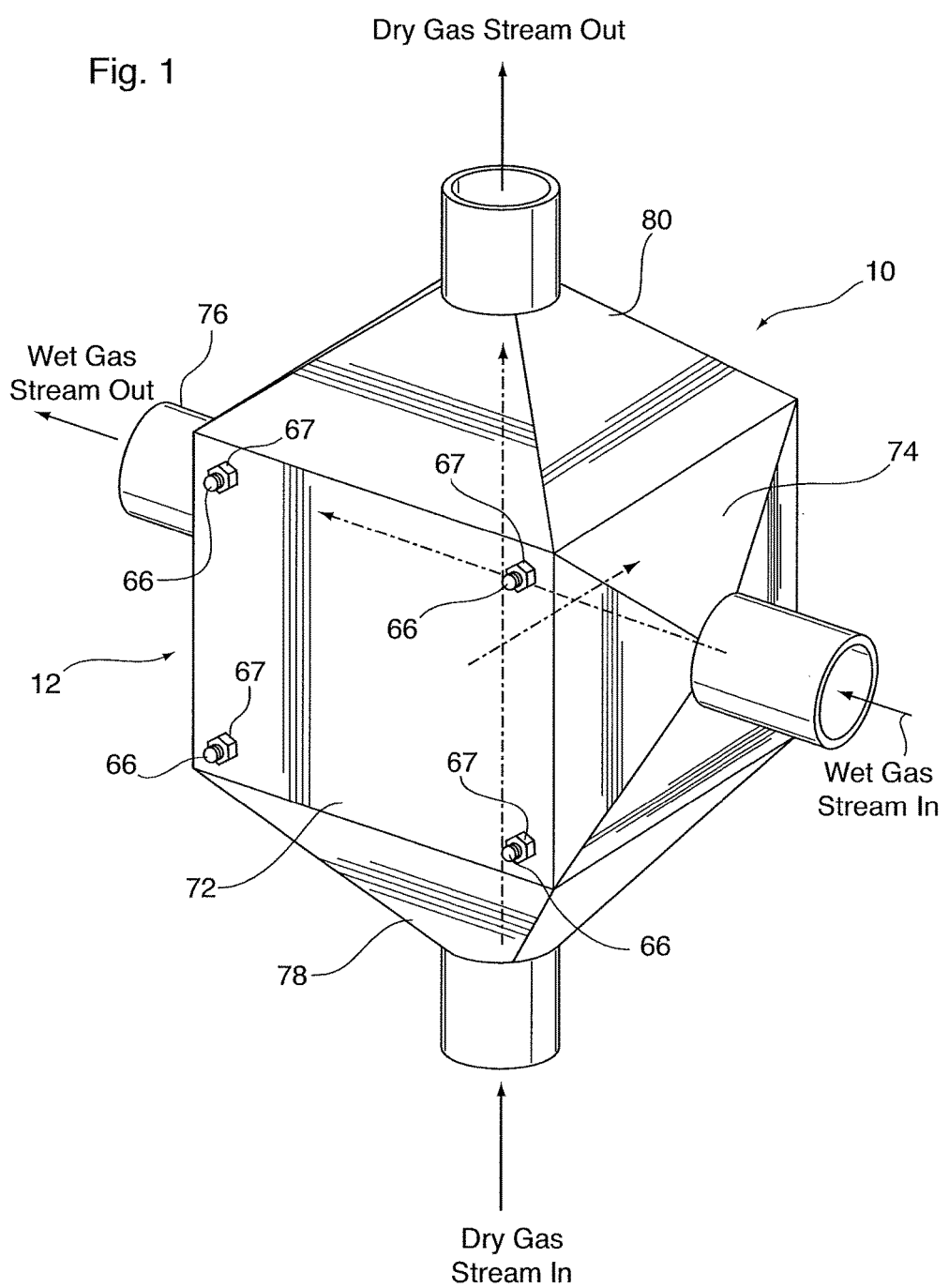

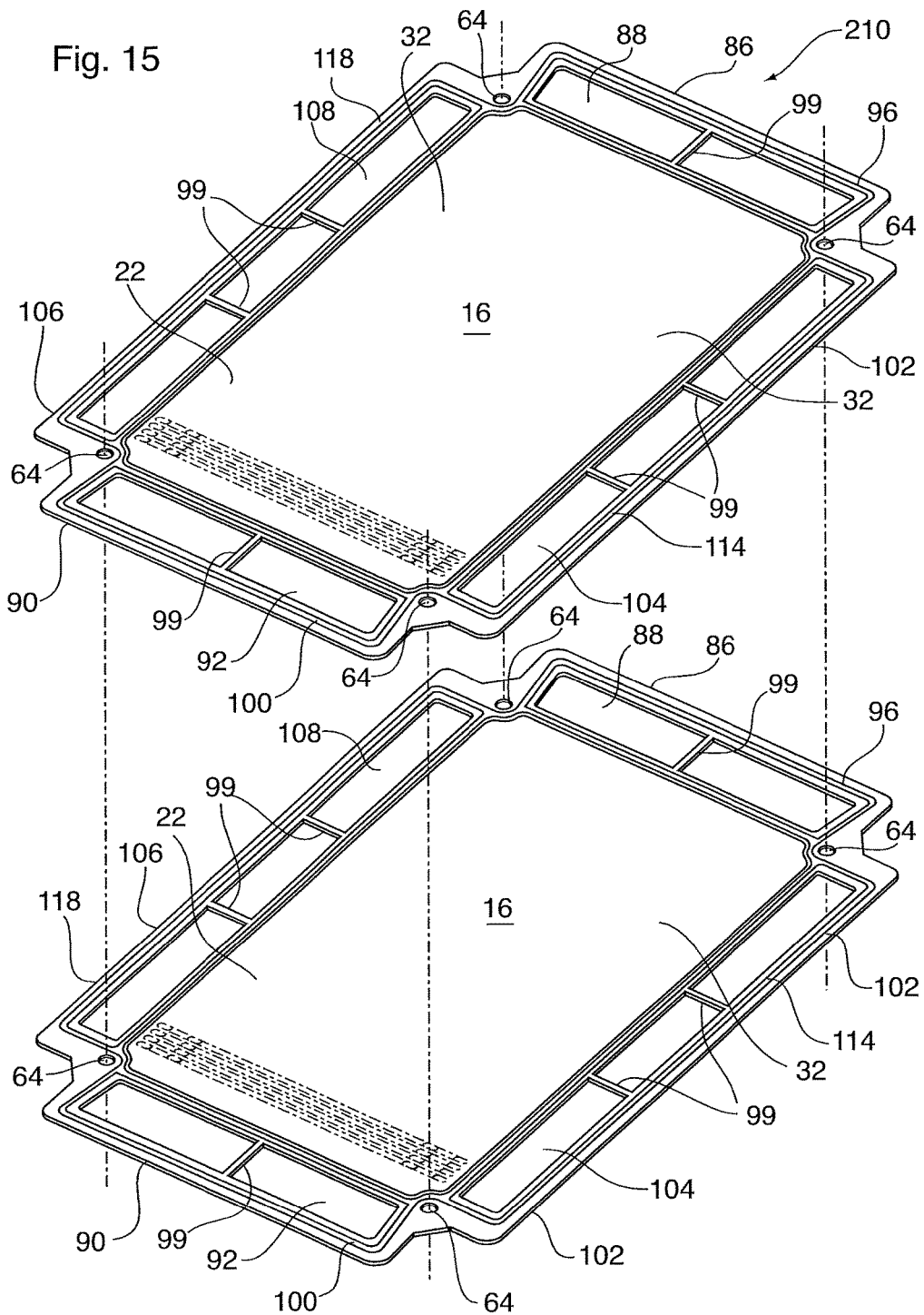

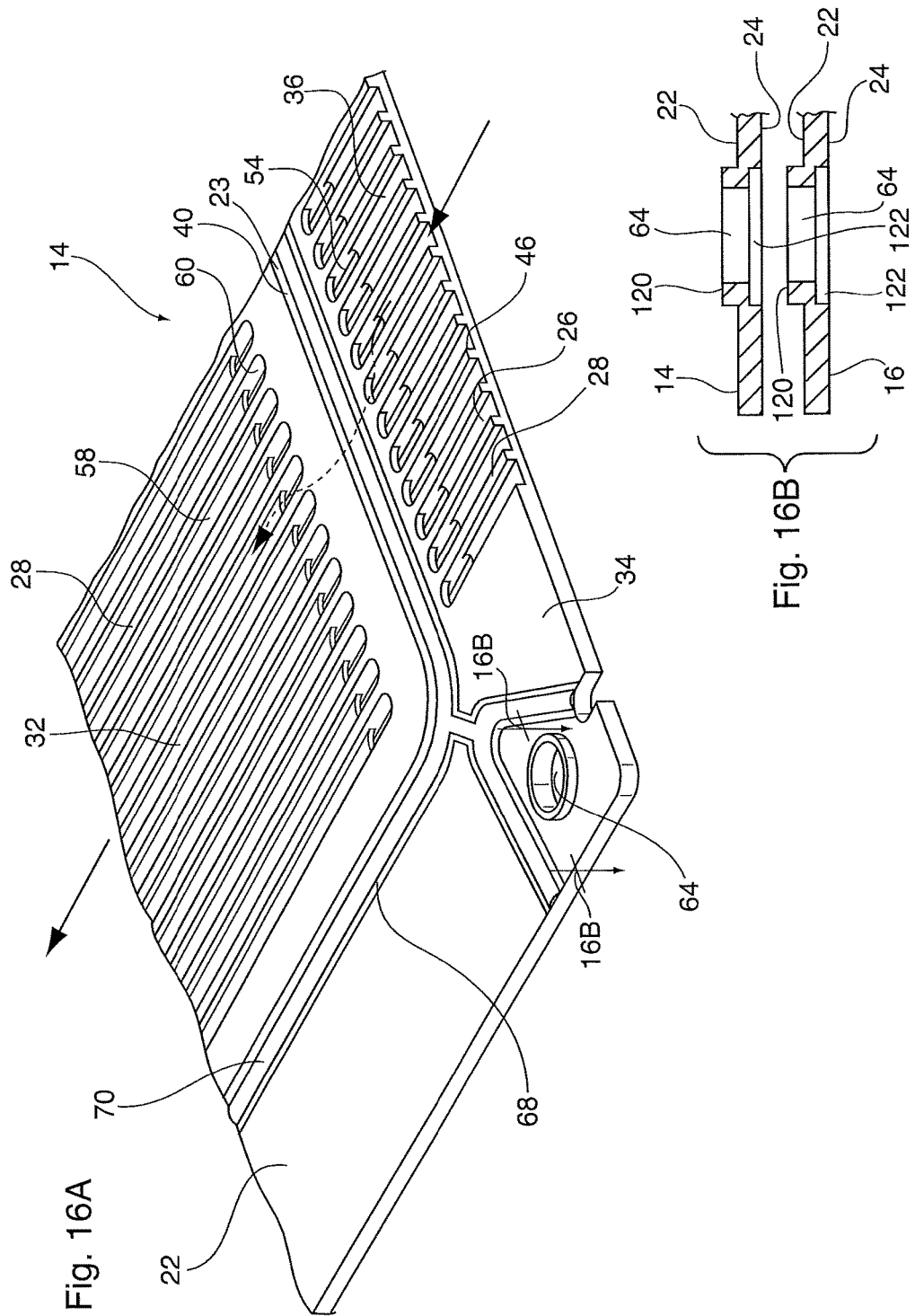

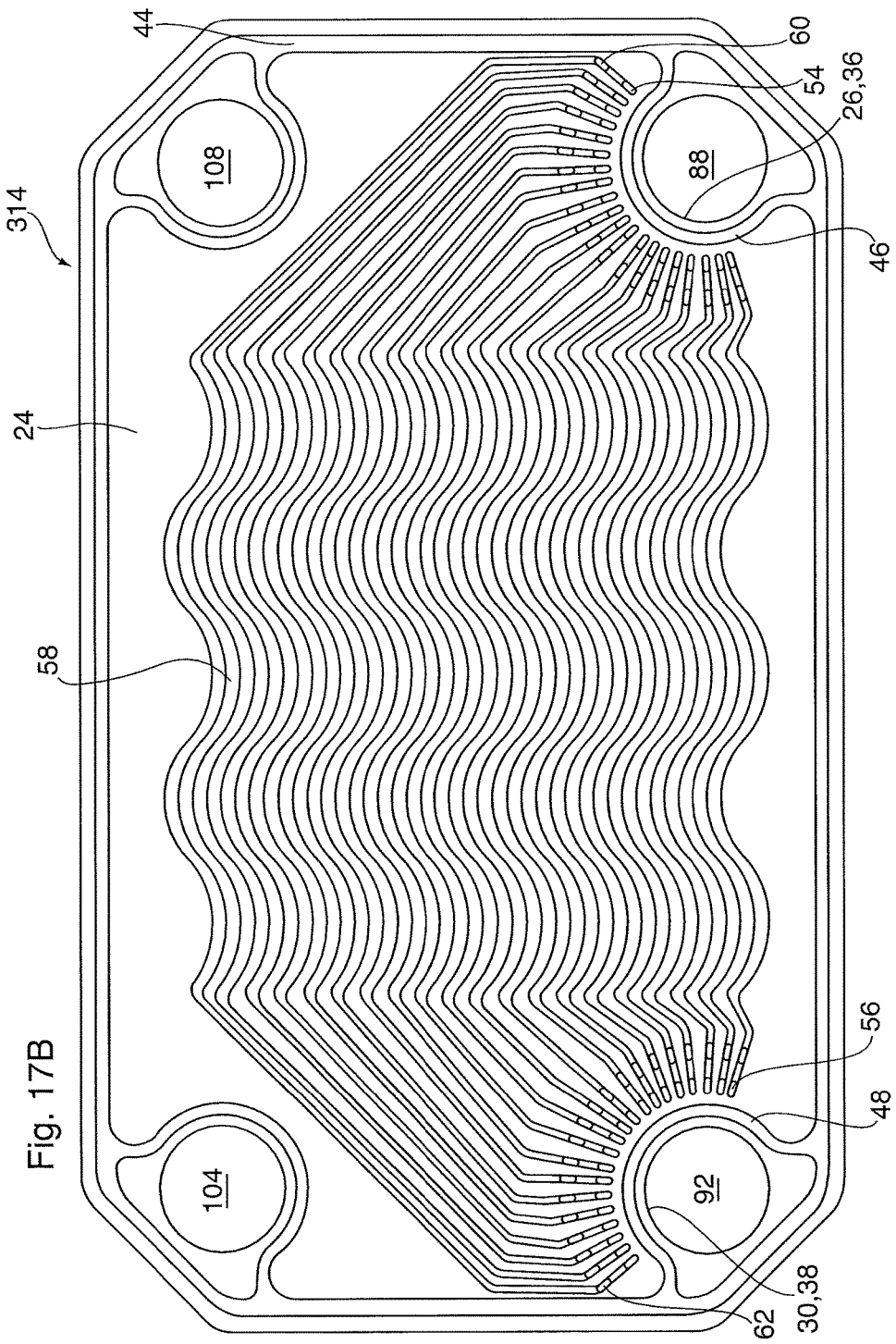

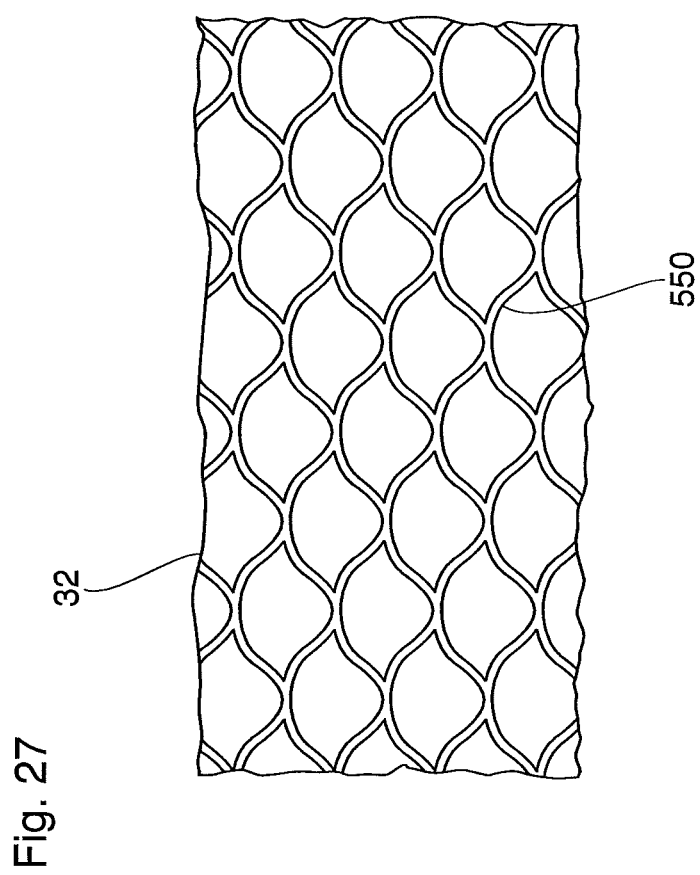

HUMIDIFIER FOR FUEL CELL SYSTEMS

CROSS-REFERENCE TO RELATED APPLICATION

This application is a continuation-in-part which claims the benefit of U.S. patent application Ser. No. 13/225,877 filed Sep. 6, 2011, now U.S. Pat. No. 8,919,746 the content of which is incorporated herein by reference.

FIELD OF THE INVENTION

The invention relates to humidifiers for humidifying a reactant gas in a fuel cell system.

BACKGROUND OF THE INVENTION

Fuel cell systems generate electrical power from an electrochemical reaction between a fuel and an oxidant. Many fuel cell systems use a gaseous fuel, such as molecular hydrogen, and a gaseous oxidant such as molecular oxygen contained in air. The reaction between hydrogen and oxygen generates water which is exhausted in the waste gases of the fuel cell.

Many fuel cells, and especially fuel cells used for automotive propulsion, are based on proton exchange membrane (PEM) technology. These fuel cells contain PEM membranes that operate at about 80° C., and which must be kept moist for optimal performance and durability of the fuel cell. This can be accomplished by ensuring that one or both of the reactant gases contain sufficient moisture to prevent dehydration of the membranes. For example, it is known to incorporate humidifiers into fuel cell systems for moisturizing at least one of the reactant gases by transfer of water vapour from the waste gases of the fuel cell. Humidifiers are potentially useful in many fuel cell applications including stationary and portable power applications, but are particularly useful in vehicular applications where it is important to maximize power density and durability of the fuel cell, while minimizing cost and size.

In typical prior art fuel cell humidifiers, water-permeable membranes supported by gas diffusion layers are interposed between wet and dry gas streams, and water vapour is transferred from the wet gas stream, across the water-permeable membrane and through the gas diffusion layers, into the dry gas stream. Prior art membrane-based humidifiers include both tubular and planar configurations. Planar configurations offer potential benefits of high performance efficiency, compact size, and low cost of manufacture. Technical challenges in planar humidifiers include achievement of high surface area exposure of the membranes to the exchange gases at controlled fluid flow rates, meaning that tightly packed and very small and consistent repeat cell (plate to membrane) distances are necessary; and in conjunction with reliably sealed membrane-to-plate, and plate-to-plate joints. To maintain tightly packed cell spacing, the plates need to be very thin, yet also provide for effective flow channels for the exchange gases to communicate with the interspaced membranes and gas diffusion layers. Moreover, the compressive forces and means to assemble and hold the plate flow channels and membranes together, must be low enough to avoid either damaging the fragile membrane/diffusion layer media, or of inducing variability in the spacing of the plate-membrane cells.

There remains a need for improvement in the structure of fuel cell humidifiers, in order to address the challenges mentioned above in an effective and cost-efficient manner.

SUMMARY OF THE INVENTION

According to one embodiment, there is provided a humidifier for transferring water vapour from a first gas stream to a second gas stream. The humidifier comprises: (a) a plurality of plates arranged in a stack, each of said plates defining a gas flow passage for either said first gas stream or said second gas stream. Each of said plates comprises: (i) a top, a bottom and a thickness measured between said top and bottom; (ii) an inlet opening along an edge of the plate; (iii) an outlet opening along an edge of the plate; (iv) a flow field defined in a central portion of the plate, the flow field having an open top along the top of the plate and an open bottom along the bottom of the plate; (v) an inlet passage connecting said inlet opening to the open top and the open bottom of said flow field; (vi) an outlet passage connecting the open top and the open bottom of said flow field to said outlet opening; (vii) a planar top sealing surface extending along the top of the plate, wherein the top sealing surface extends continuously around the flow field, and includes bridging portions extending across the inlet passage and the outlet passage; (viii) a planar bottom sealing surface extending along the bottom of the plate, wherein the bottom sealing surface extends continuously around the flow field, and includes bridging portions extending across the inlet passage and the outlet passage; (ix) a plurality of support structures located within the flow field and extending between the top and bottom of the plate. Pairs of said plates are sealed together in said stack with the top sealing surface of one plate sealed to the bottom sealing surface of an adjacent plate. The humidifier further comprises (b) a plurality of water permeable membranes, wherein one of said membranes is provided between each pair of adjacent plates in said stack, and is sealed to said pair of adjacent plates, and wherein said support structures provide support for said water permeable membranes within the flow fields; (c) a pair of manifolds for said first gas stream, and a pair of manifolds for said second gas stream, wherein a first pair of said manifolds is in flow communication with a first plurality of said plates defining said gas flow passages for said first gas stream, and wherein a second pair of said manifolds is in flow communication with a second plurality of said plates defining said gas flow passages for said second gas stream, wherein said plates are stacked and said manifolds are arranged such that the gas flow passages for said first gas stream alternate with the gas flow passages for said second gas stream throughout said stack, and such that each of the water permeable membranes separates one of the gas flow passages for the first gas stream from one of the gas flow passages for the second gas stream.

According to an embodiment, the humidifier further comprises a plurality of gas diffusion layers, wherein each said gas diffusion layer is located between one of said membranes and the flow field of one of said plates.

According to an embodiment, said gas diffusion layers are provided on both sides of each of said membranes.

According to an embodiment, said gas diffusion layers are provided only on one side of each of said membranes, and that said side of said membrane is the side which is facing a flow field for the first gas stream, such that each said gas diffusion layer is in contact with said first gas stream.

According to an embodiment, the support structures located within the flow field of each of the plates comprise a plurality of ribs extending through the flow field between the inlet and outlet passages. The ribs may have a height which is substantially the same as the thickness of the plate. Where the humidifier includes a plurality of gas diffusion layers, the height of the ribs is reduced by an amount corresponding to the thickness of the gas diffusion layer. The ribs are spaced apart by a distance sufficient to support the membrane.

According to an embodiment, the flow field has four sides, with the inlet and outlet passages being provided at opposite sides of the flow field, and wherein the ribs extend straight across the flow field between the inlet and outlet passages. Adjacent plates in said stack may be arranged in cross-flow configuration, with the ribs of adjacent plates arranged at 90 degrees to one another.

According to an embodiment, adjacent ribs within each of the plates may be connected together by a plurality of webs, each of said webs having a top surface and a bottom surface. The webs may be formed in a plane which is located between the top and bottom of the plate. The webs may extend continuously throughout the length of the ribs, except that openings are provided at the ends of the ribs so as to permit flow communication between the inlet and outlet passages along both the top and bottom surfaces of said webs.

According to an embodiment, the top and bottom sealing surfaces may be offset from one another. The top and bottom sealing surfaces may each cover different areas of the inlet and outlet passages.

According to an embodiment, a dive-through opening may extend through the plate between portions of the top and bottom sealing surfaces which extend across the inlet and outlet passages.

According to an embodiment, each of the plates may be provided with at least one integral manifold opening, such that at least one of the manifolds is integrally formed with the plates. Each of the plates may be provided with four integral manifold openings, such that the first pair of manifolds and the second pair of manifolds are integrally formed with the plates.

According to an embodiment, the plates are four-sided and the inlet and outlet openings are formed along peripheral edges of the plates. The plates may be square or rectangular.

According to an embodiment, each pair of said adjacent ribs is connected by a plurality of said webs, and wherein said webs are spaced apart from one another along the length of said ribs such that a plurality of openings through the plate are provided between each pair of said adjacent ribs.

According to an embodiment, there is provided a humidifier for transferring water vapour from a first gas stream to a second gas stream, the humidifier comprising: (a) a plurality of plates arranged in a stack, each of said plates defining a gas flow passage for either said first gas stream or said second gas stream, wherein each of said plates comprises: (i) a top, a bottom and a thickness measured between said top and bottom; (ii) an inlet opening along an edge surface of the plate; (iii) an outlet opening along an edge surface of the plate; (iv) a flow field defined in a central portion of the plate, the flow field having an open top along the top of the plate and an open bottom along the bottom of the plate; (v) an inlet passage connecting said inlet opening to the open top and the open bottom of said flow field; (vi) an outlet passage connecting the open top and the open bottom of said flow field to said outlet opening; (vii) a planar top sealing surface extending along the top of the plate, wherein the top sealing surface extends continuously around the flow field, and includes bridging portions extending across the inlet passage and the outlet passage; (viii) a planar bottom sealing surface extending along the bottom of the plate, wherein the bottom sealing surface extends continuously around the flow field, and includes bridging portions extending across the inlet passage and the outlet passage; (ix) a plurality of support structures located within the flow field and extending between the top and bottom of the plate; wherein pairs of said plates are sealed together in said stack with the top sealing surface of one plate sealed to the bottom sealing surface of an adjacent plate; (b) a plurality of water permeable membranes, wherein one of said membranes is provided between each pair of adjacent plates in said stack, and is sealed to said pair of adjacent plates, and wherein said support structures provide support for said water permeable membranes within the flow fields; (c) a plurality of manifolds for said first gas stream and a plurality of manifolds for said second gas stream, wherein each of said manifolds for said first gas stream is in flow communication with a first plurality of said plates defining said gas flow passages for said first gas stream, and wherein each of said manifolds for said second gas stream is in flow communication with a second plurality of said plates defining said gas flow passages for said second gas stream; wherein said plates are stacked and said manifolds are arranged such that the gas flow passages for said first gas stream alternate with the gas flow passages for said second gas stream throughout said stack, and such that each of the water permeable membranes separates one of the gas flow passages for the first gas stream from one of the gas flow passages for the second gas stream; wherein the plurality of support structures located within the flow field of each of the plates comprises a plurality of ribs; and wherein each of the ribs has an undulating wave shape in a central portion thereof.

According to an embodiment, the humidifier has first and second opposed ends; wherein the plurality of manifolds includes at least one manifold located intermediate the ends of the humidifier, said at least one manifold being in flow communication with one of said manifolds at the first end of the humidifier and one of said manifolds at the second end of the humidifier.

According to an embodiment, the at least one manifold located intermediate the ends of the humidifier is located in a central portion of the humidifier.

According to an embodiment, at least some of said plates comprise a central portion and a surrounding perimeter portion, said central portion comprising at least a portion of the flow field, and wherein the central portion and the peripheral portion are separately formed, such that each of said plates comprises an assembly of the central portion and the perimeter portion.

According to an embodiment, a joint between the central portion and the perimeter portion will be located inwardly of the top and bottom sealing surfaces of the plate.

According to an embodiment, there is provided a humidifier for transferring water vapour from a first gas stream to a second gas stream, the humidifier comprising: (a) a plurality of plates arranged in a stack, each of said plates defining a gas flow passage for either said first gas stream or said second gas stream, wherein each of said plates comprises: (i) a top, a bottom and a thickness measured between said top and bottom; (ii) an inlet opening along an edge surface of the plate; (iii) an outlet opening along an edge surface of the plate; (iv) a flow field defined in a central portion of the plate, the flow field having an open top along the top of the plate and an open bottom along the bottom of the plate; (v) an inlet passage connecting said inlet opening to the open top and the open bottom of said flow field; (vi) an outlet passage connecting the open top and the open bottom of said flow field to said outlet opening; (vii) a planar top sealing surface extending along the top of the plate, wherein the top sealing surface extends continuously around the flow field, and includes bridging portions extending across the inlet passage and the outlet passage; (viii) a planar bottom sealing surface extending along the bottom of the plate, wherein the bottom sealing surface extends continuously around the flow field, and includes bridging portions extending across the inlet passage and the outlet passage; (ix) a plurality of support structures located within the flow field and extending between the top and bottom of the plate; wherein pairs of said plates are sealed together in said stack with the top sealing surface of one plate sealed to the bottom sealing surface of an adjacent plate; (b) a plurality of water permeable membranes, wherein one of said membranes is provided between each pair of adjacent plates in said stack, and is sealed to said pair of adjacent plates, and wherein said support structures provide support for said water permeable membranes within the flow fields; (c) a plurality of manifolds for said first gas stream and a plurality of manifolds for said second gas stream, wherein each of said manifolds for said first gas stream is in flow communication with a first plurality of said plates defining said gas flow passages for said first gas stream, and wherein each of said manifolds for said second gas stream is in flow communication with a second plurality of said plates defining said gas flow passages for said second gas stream; wherein said plates are stacked and said manifolds are arranged such that the gas flow passages for said first gas stream alternate with the gas flow passages for said second gas stream throughout said stack, and such that each of the water permeable membranes separates one of the gas flow passages for the first gas stream from one of the gas flow passages for the second gas stream; wherein the plurality of support structures located within the flow field of each of the plates comprises a porous material which is sufficiently porous to permit gas flow through the flow field.

According to an embodiment, the porous material is comprised of a rigid or semi-rigid fibrous material comprising a network, fabric or mesh of woven or non-woven fibres, or a rigid or semi-rigid foam material having a network of open cells.

According to an embodiment, at least some of said plates comprise a central portion and a surrounding perimeter portion, said central portion comprising at least a portion of the flow field, and wherein the central portion and the peripheral portion are separately formed, such that each of said plates comprises an assembly of the central portion and the perimeter portion.

According to an embodiment, there is provided a plate for a humidifier for transferring water vapour from a first gas stream to a second gas stream. The plate comprises: (i) a top, a bottom and a thickness measured between said top and bottom; (ii) an inlet opening along an edge of the plate; (iii) an outlet opening along an edge of the plate; (iv) a flow field defined in a central portion of the plate, the flow field having an open top along the top of the plate and an open bottom along the bottom of the plate; (v) an inlet passage connecting said inlet opening to the open top and the open bottom of said flow field; (vi) an outlet passage connecting the open top and the open bottom of said flow field to said outlet opening; (vii) a planar top sealing surface extending along the top of the plate, wherein the top sealing surface extends continuously around the flow field, and includes bridging portions extending across the inlet passage and the outlet passage; (viii) a planar bottom sealing surface extending along the bottom of the plate, wherein the bottom sealing surface extends continuously around the flow field, and includes bridging portions extending across the inlet passage and the outlet passage; and (ix) a plurality of support structures located within the flow field and extending between the top and bottom of the plate.

BRIEF DESCRIPTION OF THE DRAWINGS

The invention will now be described, by way of example only, with reference to the accompanying drawings, in which:

FIG. 1 is a schematic, perspective view of a humidifier according to a first embodiment;

FIG. 15 is a view showing the stacking of plates in the humidifier according to the third embodiment;

FIGS. 16A and 16B illustrate portions of plates with snap fit elements at their corners;

FIGS. 17A and 17B are plan views showing the top and bottom of the wet plate of a humidifier according to a fourth embodiment of the invention;

FIG. 27 shows a further variation in the flow field configuration in humidifiers according to the invention.

DETAILED DESCRIPTION

Figure 2A:
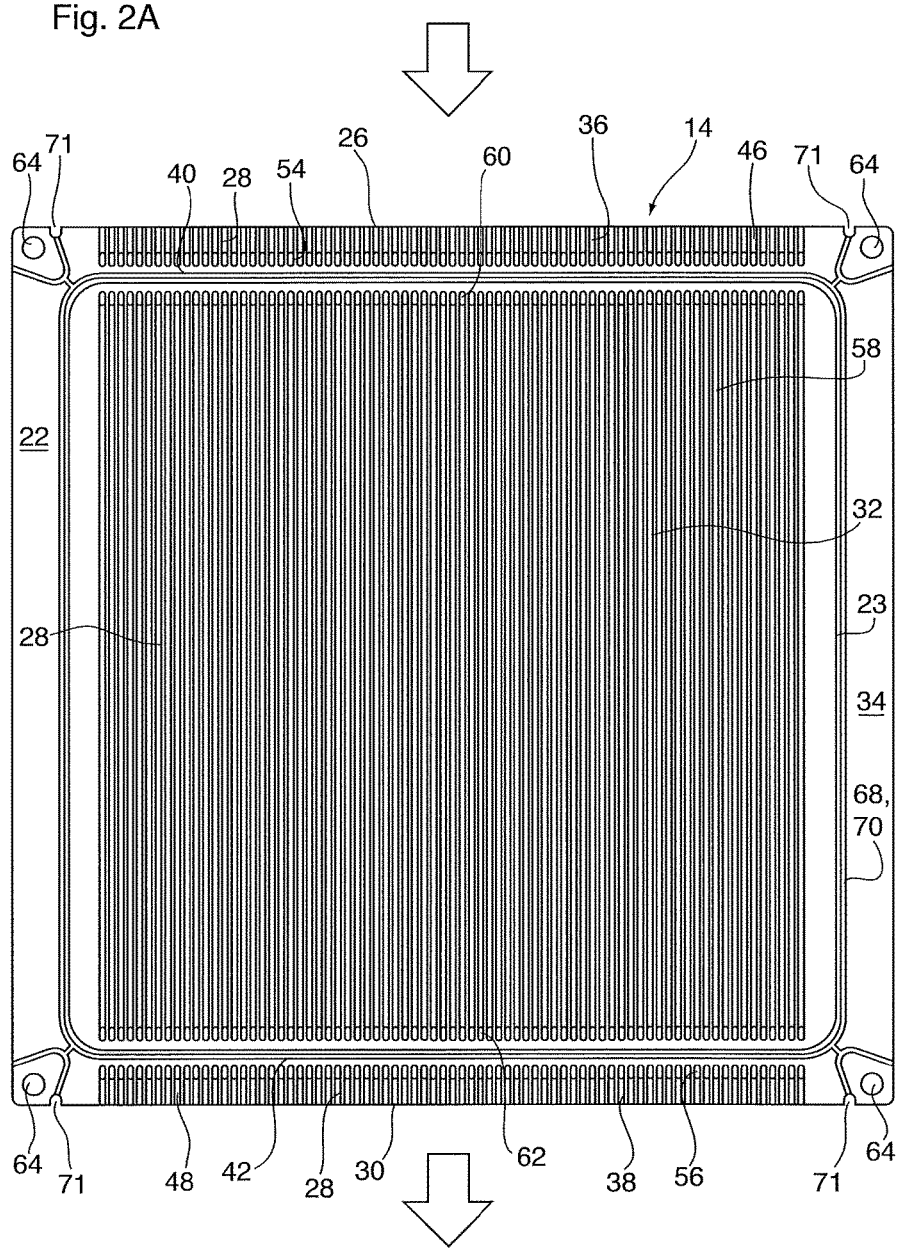
FIG. 2A is a top plan view of a wet plate of the humidifier of FIG. 1.

The following is a description of a number of embodiments of a humidifier for transferring water vapour from a first gas stream to a second gas stream. The first gas stream enters the humidifier with a relatively high water vapour content, and is sometimes referred to below as the "wet gas stream". The second gas stream enters the humidifier at a relatively low water vapour content and is sometimes referred to below as the "dry gas stream".

In the attached drawings, it will be appreciated that many the components of the humidifiers described herein are not necessarily shown to scale, and that certain dimensions, such as thickness, have been exaggerated for the sake of convenience or clarity.

In the following description, the humidifiers are described as components of a fuel cell system in which the first gas stream comprises the exhaust gas of the fuel cell cathode, and the second gas stream comprises air from the environment of the fuel cell system. The cathode exhaust gas comprises air which has been reacted in the fuel cell, and which has a relatively low oxygen content and a relatively high content of water vapour, since oxygen is consumed and water is produced by the chemical reaction in the fuel cell. The air in the second gas stream has a relatively low water content and may undergo compression and cooling in a cathode (or charge) air cooler before it enters the humidifier. This is especially true for automotive fuel cell systems, where the cathode air is preferentially pressurized to about 1.5 to 2 bar, before delivering it to the fuel cell engine.

It will be appreciated that the dry gas stream may instead comprise the incoming hydrogen-containing fuel stream, in which case the wet gas stream will typically comprise anode exhaust gas, which has a higher content of water vapour than the incoming hydrogen-containing gas stream.

Illustrated in FIGS. 1 to 8 is a humidifier 10 according to a first embodiment. Humidifier 10 is made up of a core 12 comprising a stack of plates, further described below, and two pairs of manifolds located external to the core 12. In the following description, the terms "core" and "stack" are used interchangeably.

The core 12 has a total of six faces, with the wet gas stream entering the core 12 through one of its faces and exiting the core 12 through an opposite face. Similarly, the dry gas stream enters the core 12 through one of its faces and exits the core 12 through an opposite face. The remaining two faces are not involved in water exchange, but serve as mechanical fixturing surfaces for compression assembly of the humidifier stack between a pair of structural end plates 72, 173, as further described below and illustrated in FIG. 7.

The core 12 of humidifier 10 comprises a plurality of wet plates 14 and a plurality of dry plates 16 stacked in alternating order throughout the stack. The wet plates 14 and dry plates 16 are flat and have four sides. In the illustrated embodiment, all four sides of each plate 14, 16 are of equal length, such that plates 14, 16 are square. It will be seen that, with the exception of the location of sealing grooves 71, the function of which will be discussed below, the wet and dry plates 14 and 16 are identical. In some embodiments the grooves 71 could be provided along all four sides or eliminated entirely, depending on the manifold configuration, in which case the wet and dry plates would be identical. The plates 14, 16 may also have a rectangular configuration including two long sides and two shorter sides, in which case two different plate configurations would be required.

Figure 2B:
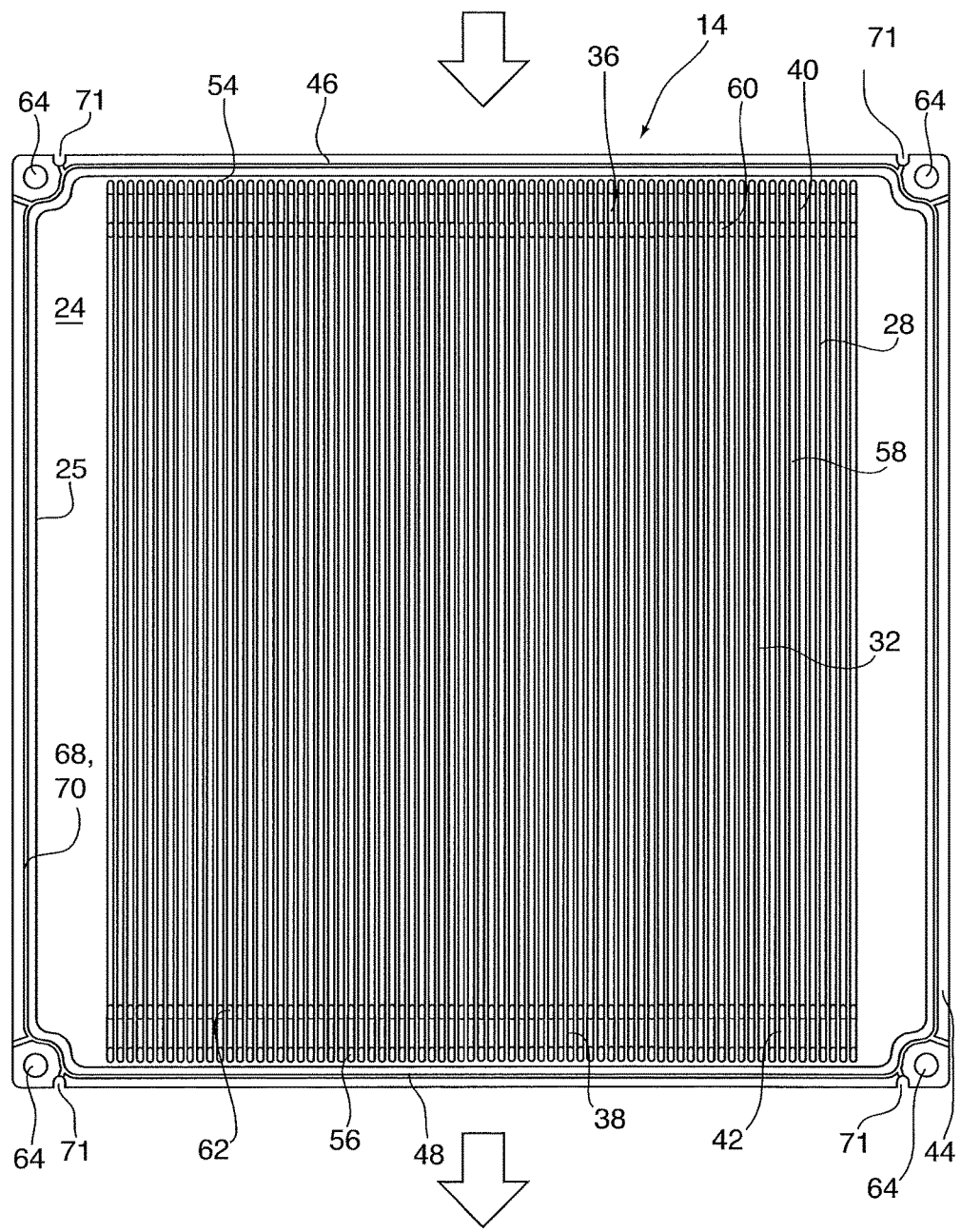
FIG. 2B is a bottom plan view of the wet plate.
Figure 3A:
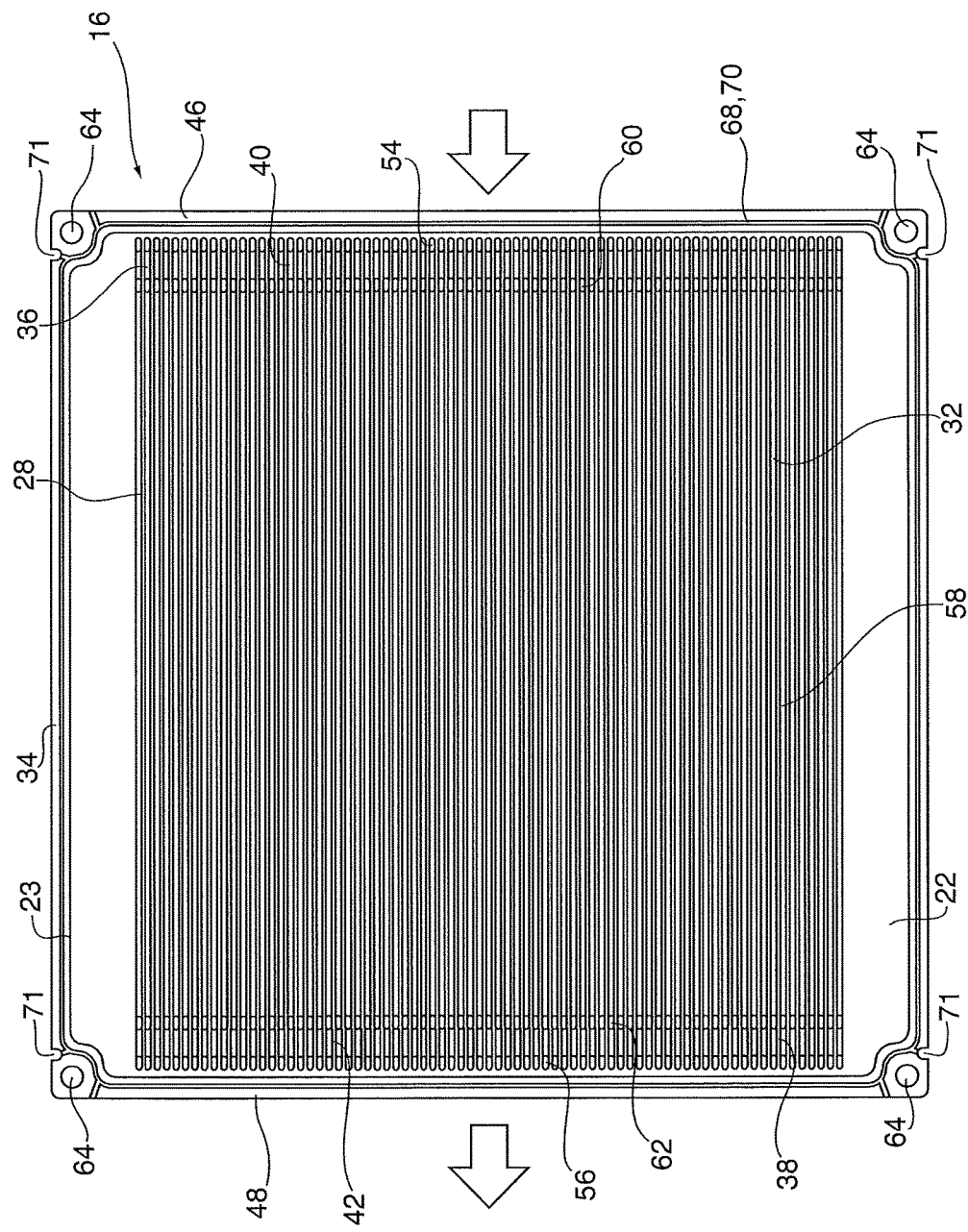
FIG. 3A is a top plan view of a dry plate of the humidifier of FIG. 1.
Figure 3B:
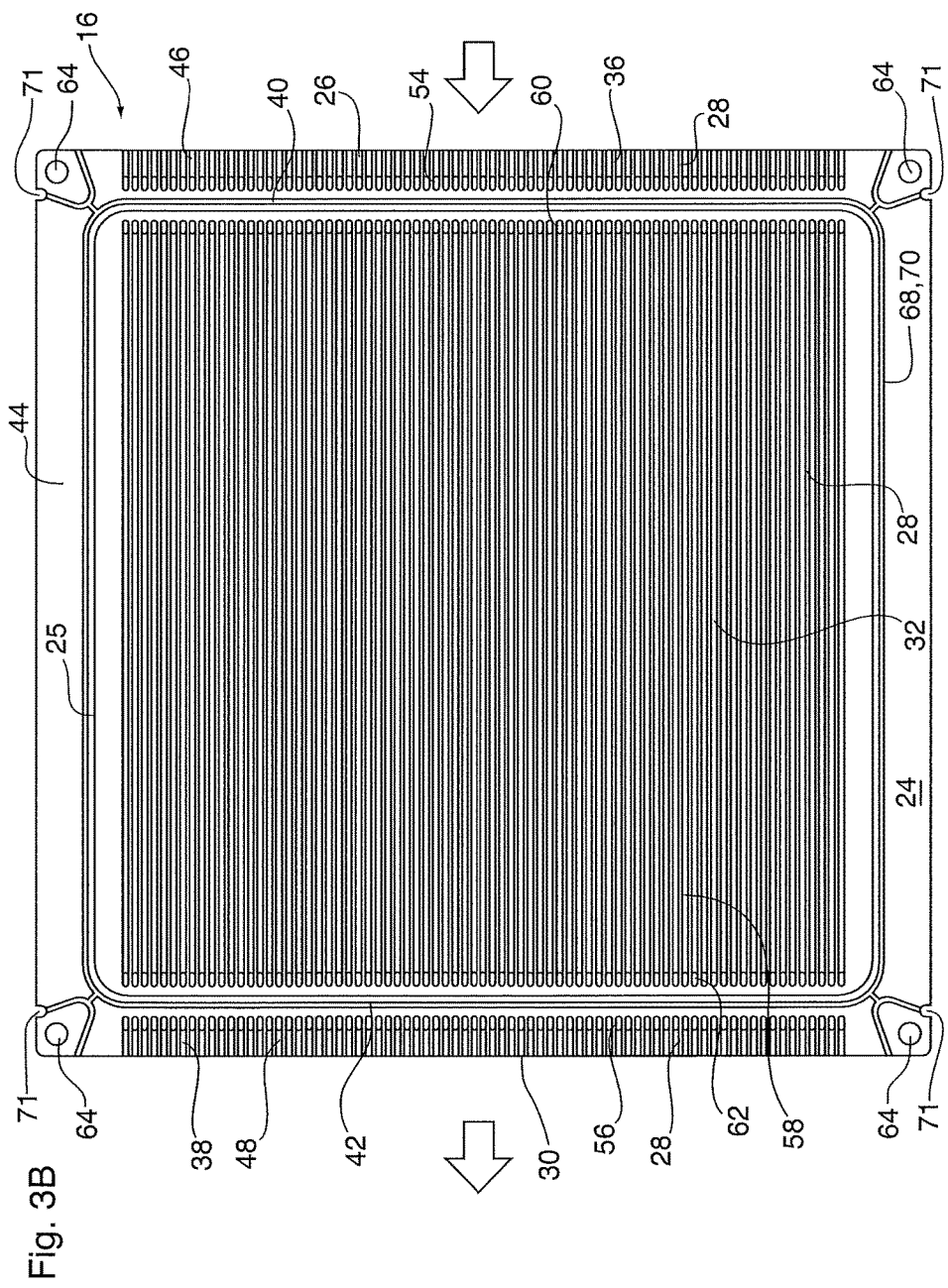
FIG. 3B is a bottom plan view of the dry plate.

The wet plates 14 are configured for flow of the wet gas stream (e.g. cathode exhaust gas) parallel to two sides of plates 14 in the direction of the arrows in FIGS. 2A and 2B, and the dry plates 16 are configured for flow of the dry gas stream (e.g. air) parallel to two sides of the plates 16 in the direction of the arrows in FIGS. 3A and 3B. The wet and dry plates 14, 16 in stack 12 are oriented such that the respective wet and dry gas streams flow through the humidifier 10 at right angles to one another, and therefore humidifier 10 is a cross-flow humidifier. Because the wet and dry plates 14 and 16 are substantially identical to one another, the following description will focus primarily on the wet plate 14, it being understood that the description of the wet plate 14 also applies to the dry plate 16, unless otherwise stated. Also, in the drawings and in the following description, like elements of wet plates 14 and dry plates 16 are identified by like reference numerals.

For compatibility with moist air, the plates 14, 16 are constructed from polymeric materials. In order to achieve the precise thicknesses and features required, the plates may be manufactured by a molding process, such as compression molding, compression/injection molding, injection molding, sheet molding or thermo forming.

Figure 6:
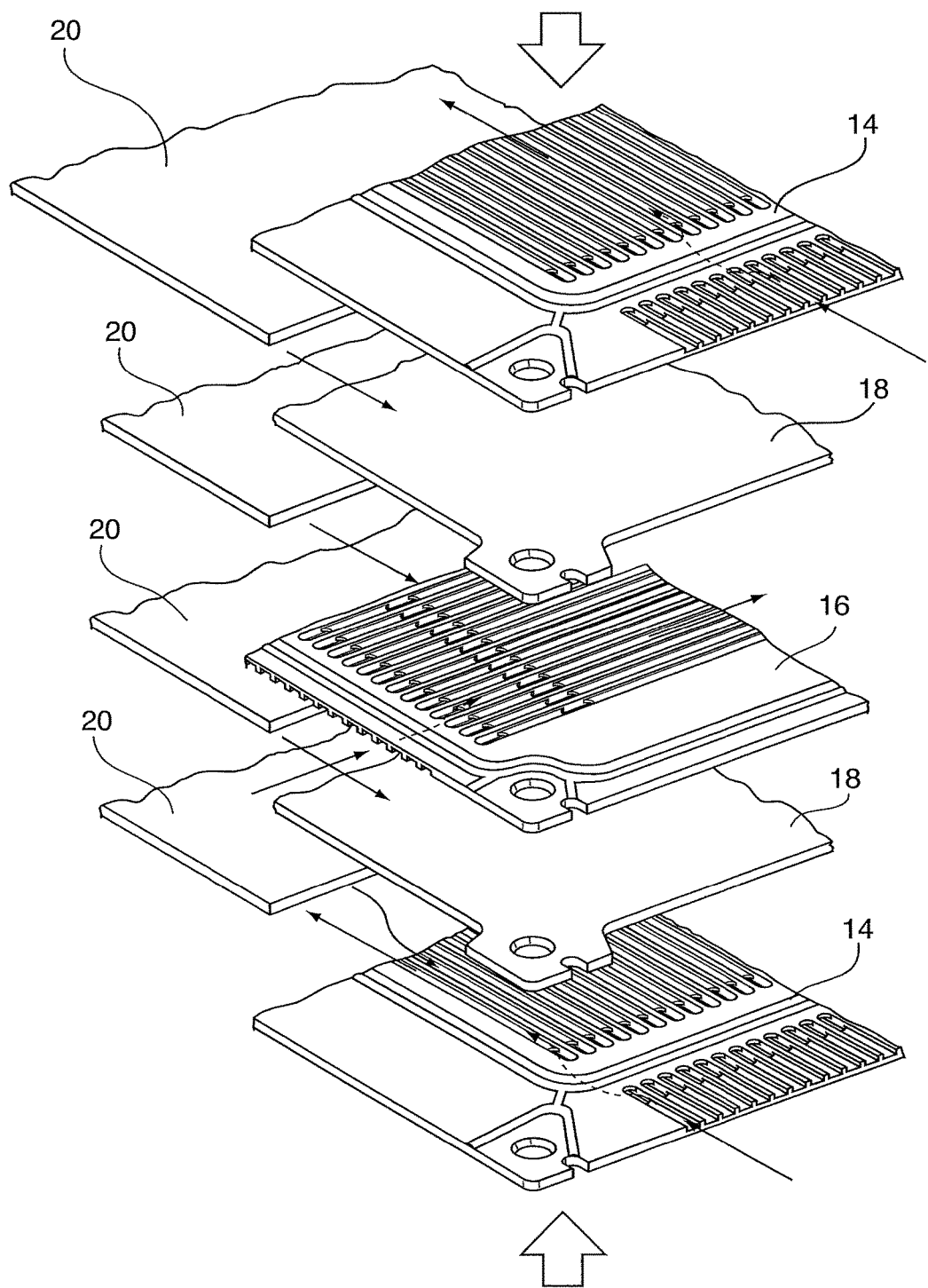
FIG. 6 is an exploded perspective view of a corner of the core of the humidifier of FIG. 1.

In humidifier 10, the wet gas stream flows across both the top and bottom surfaces of each wet plate 14, while the dry gas stream flows across both the top and bottom surfaces of each dry plate 16. Within the core 12, water permeable membranes 18 are sandwiched and sealed between adjacent plates in the stack, as shown in FIG. 6, in order to physically separate the wet and dry gas streams from one another and to permit transfer of water vapour from the wet gas stream to the dry gas stream.

Membranes 18 are extremely thin plastic films, and must be supported in order to function properly. For this reason, each membrane 18 in the stack is normally supported on both sides by a gas diffusion layer 20, shown in FIG. 6, sometimes also referred to herein as a "diffusion medium". In humidifier 10, gas diffusion layers 20 are provided on both sides of each membrane 18. Each gas diffusion layer 20 may comprise a hydrophilic carbon fiber mat which is substantially thicker and more rigid than membrane 18, but which is relatively thin and flexible in comparison with the plates 14, 16. The gas diffusion layer 20 typically has a thickness of about 0.10 mm, while the membrane 18 may have a thickness on the order of less than about 100 microns.

Because the incoming dry gas stream is compressed, it typically has a pressure higher than that of the wet gas stream. The inventors have appreciated that the higher pressure in the dry gas stream will tend to push the membrane 18 away from the surface of the dry plate 16, and therefore it may not be necessary to provide a gas diffusion layer 20 between the membrane 18 and the dry plate 16. The inventors have also found that the performance of the humidifier is not impaired by removing the dry side gas diffusion layer 20, provided that the wet side gas diffusion layer 20 is properly supported using appropriate flow field designs as described herein. Therefore, the provision of a gas diffusion layer 20 on the dry side of membrane 18 is optional and, in some embodiments of the invention, a gas diffusion layer 20 is only provided on the wet side of each membrane 18, i.e. between the membrane 18 and the wet plate 14.

The gas streams enter and leave the core 12 through the outer edges of the plates 14, 16, and water vapour transfer takes place between the central portions of the plates (also referred to herein as "flow fields"). In order to prevent mixing of the wet and dry gas streams, the wet and dry plates 14, 16 are sealed together around the peripheries of the flow fields. The construction of plate 14 is now discussed below.

The wet plate 14 includes a top 22 and an opposite bottom 24, and has a thickness T (FIGS. 4-5), defined as the maximum distance between the top 22 and bottom 24 of plate 14. The product design goal is to maximize the effective surface area of the membranes 18 between the wet and dry gas streams, while keeping thickness T relatively small (in typical range of 0.75 to 3 mm) in order to minimize the total volume and height of the stack. The thickness T of the wet plates 14 may differ from the thickness T of the dry plates 16, depending on their respective channel geometries and pressure drop needs. It will be appreciated that the terms "top" and "bottom" are used herein for convenience only, and should not be interpreted as limiting the orientation of the plates or the humidifiers described and claimed herein.

The wet plates 14 are now described below with reference to FIGS. 2A and 2B.

A flow field 32 is defined in a central portion of the plate 14. The flow field 32 defines the area in which transfer of water vapour takes place between the wet gas stream and the dry gas stream across membrane 18, and therefore the area of flow field 32 relative to the total area of plate 14 is preferably maximized. In humidifier 10, the flow field 32 is substantially square or rectangular in shape, and extends close to the peripheral edges of plate 14. The flow field 32 also includes a plurality of support structures which provide support for the membrane 18 and the gas diffusion layers 20, so as to prevent the membrane 18 and gas diffusion layers 20 from sagging and constricting or blocking the flow of the wet gas stream across the plate 14. In humidifier 10, these support structures are in the form of support ribs 28 extending longitudinally throughout the length of the flow field 32.

The support ribs 28 are sufficiently closely spaced to provide support for the membrane 18 and gas diffusion layer 20. A typical inter-rib spacing is about 1.0 to about 3.0 mm, for example about 1.5 mm. The ribs 28 are relatively thin, and have a top land width which is sufficiently wide to support the membrane 18 and gas diffusion layer 20 without shearing them, but not so wide as to create a tenuous path for water vapour transport in the interface region of the rib land to the membrane 18 and/or gas diffusion layer 20, and thin enough to avoid overly constricting the channel opening used for fluid flow. The ribs 28 are also parallel to one another so as not to unduly increase the pressure drop. The ribs 28 typically have a width of about 0.3 to about 1.0 mm, for example about 0.5 mm. Because the gas diffusion layer(s) 20 also provide support for the membrane 18, the use of a thicker gas diffusion layer allows wider rib spacing and wider ribs 28, but increases stack height. The exemplary rib thicknesses and spacings disclosed above are based on a typical gas diffusion layer 20 thickness of about 0.1 mm. With the ribs 28 supporting the membrane 18 and optionally the gas diffusion layer 20, the flow field 32 has an open top and an open bottom.

The support ribs 28 extending through the flow field 32 have a height which is substantially the same as the thickness T of plate 14, but which is typically slightly less than the thickness T, since the flow field 32 and the surrounding portions of plate 14 immediately outside the flow field 32 are reduced in thickness in order to form a shallow pocket in which the gas diffusion layer 20 is received. It can be seen that a shoulder 23 is provided on the top 22 of wet plate 14, which defines the area of reduced thickness and which defines the area of the gas diffusion layer 20. A corresponding shoulder 25 is provided on the bottom 24 of plate 14. Therefore, in the illustrated embodiment as shown in the cross-section of FIG. 8, the total height of ribs 28 in the flow field 32 of plate 14 is equal to a substantial portion of the plate thickness. For example, the height of the ribs may be substantially the same as the thickness T of plate 14, minus approximately twice the thickness of the gas diffusion layer 20.

The overall thickness T of the plates 14, 16, as well as the height, width and spacing of the ribs 28 are not necessarily the same on the wet plate 14 as on the dry plate 16. For example, these dimensions may be varied in order to adjust pressure drop in the wet and dry gas streams, and may be varied to take into account the pressure differential between the wet and dry gas streams. In this regard, the ribs 28 of the dry plates 16 may be spaced farther apart and made shallower than the ribs 28 of the wet plates 14 to increase flow velocity and performance through the membrane 18, and to make the core 12 more compact. The ribs 28 will typically need to be closer together on the wet plate 14 because the gas pressure in the core 12 tends to push the membrane 18 and the gas diffusion layer(s) 20 away from the dry plates 16 and into the spaces between ribs 28 of the wet plates 14. In contrast, the spacing between ribs 28 can be greater in the dry plates 16, where the primary function of the ribs 28 is to control gas flow. Also, the pockets 23, 25 for the gas diffusion layer 20 may be eliminated in the dry plate 16 in embodiments where the optional gas diffusion layer 20 is eliminated on the dry side of membrane 18, and this will have an impact on the height of ribs 28 in the dry plate 16.

Rather than using support ribs, it will be appreciated that dimples, elongated dimples, wavy or angled discontinuous ribs, or other protrusions could be provided as support structures.

The wet plate 14 has an inlet opening 26 provided in an edge surface of plate 14, in this case being an edge surface which extends along the outer peripheral edge of plate 14, on one side of plate 14. Inlet opening 26 extends along most of the length of this edge surface, terminating close to the corners of the plate 14. Inlet opening 26 is open at the top 22 of plate 14 and closed at the bottom 24.

An inlet passage 36 connects the inlet opening 26 to the flow field 32, and provides flow communication from the inlet opening 26 to the open top and open bottom of the flow field 32. The support ribs 28 of the flow field 32 extend through the inlet passage 36 to the edge surface in which inlet opening 26 is provided, thereby dividing and providing support for the inlet opening 26 and for the inlet passage 36. The wet plate 14 also has a similarly configured outlet opening 30 provided in an edge surface of plate 14, the edge surface extending along the opposite outer peripheral edge of plate 14, also defining one of the sides of plate 14. Outlet opening 30 extends along most of the length of this edge surface, terminating close to the corners of the plate 14. The outlet opening 30 is also open at the top 22 of plate 14 and closed at the bottom 24.

An outlet passage 38 connects the outlet opening 30 to the open top and open bottom of the flow field 32, and provides flow communication from the outlet opening 30 to the flow field 32. The support ribs 28 of the flow field 32 also extend through the outlet passage 38 to the edge surface in which outlet opening 30 is provided, dividing and providing support for the outlet opening 30 and for the outlet passage 38.

The top 22 of plate 14 is provided with a planar top sealing surface 34 along which the top 22 of plate 14 is sealed to the membrane 18 that is located between plate 14 and adjacent dry plate 16; and dry plate 16 is sealed to that same membrane 18 along its respective bottom sealing surface 44. The planar top sealing surface 34 extends continuously around the outer edges of the flow field 32, thereby completely surrounding the flow field 32, and also surrounding the gas diffusion layer 20 and shoulder 23, where applicable. The top sealing surface 34 includes a first bridging portion 40 which extends across the inlet passage 36 and a second bridging portion 42 which extends across the outlet passage 38. In these areas, the inlet passage 36 and the outlet passage 38 are closed at the top 22 of plate 14, and open at the bottom 24. These bridging portions 40, 42 allow a continuous seal to be provided along the top 22 of plate 14, while allowing the wet gas stream to flow between the outer peripheral edge surfaces of plate 14 and the central flow field 32.

The bottom 24 of plate 14 is provided with a planar bottom sealing surface 44 along which the bottom 24 of plate 14 is sealed to an adjacent dry plate 16. The planar bottom sealing surface 44 extends continuously around the outer edges of the flow field 32, thereby completely surrounding the flow field 32, and also surrounding the gas diffusion layer 20 and shoulder 25, where applicable. The bottom sealing surface 44 includes a first bridging portion 46 which extends across the inlet passage 36 and a second bridging portion 48 which extends across the outlet passage 38. In these areas, the inlet passage 36 and the outlet passage 38 are closed at the bottom 24 of plate 14, and open at the top 22. These bridging portions 46, 48 allow a continuous seal to be provided along the bottom 24 of plate 14, while allowing the wet gas stream to flow between the outer peripheral edge surfaces of plate 14 and the central flow field 32.

The dry plates 16 are now described below with reference to FIGS. 3A and 3B.

A flow field 32 is also defined in a central portion of the plate 16. The flow field 32 includes a plurality of support structures which provide support for the membrane 18 and the gas diffusion layers 20, so as to prevent the membrane 18 and gas diffusion layers 20 from sagging and constricting or blocking the flow of the wet gas stream across the plate 16. In humidifier 10, these support structures are in the form of support ribs 28 extending longitudinally throughout the length of the flow field 32. The dry plate 16 has a top 22 and a bottom 24. On the bottom 24 of dry plate 16, shown in FIG. 3B, an inlet opening 26 is provided in an edge surface of plate 16, in this case being an edge surface which extends along the outer peripheral edge of plate 16, on one side of plate 16. Inlet opening 26 extends along most of the length of this edge surface, terminating close to the corners of the plate 16. Inlet opening 26 is open at the bottom 24 of plate 16 and closed at the top 22. Plate 16 also has an inlet passage 36 connecting the inlet opening 26 to the flow field 32.

The dry plate 16 also has an outlet opening 30 provided in an edge surface of plate 16, the edge surface extending along the opposite outer peripheral edge of plate 16, also defining one of the sides of plate 16. Outlet opening 30 extends along most of the length of this edge surface, terminating close to the corners of the plate 16. The outlet opening 30 is also open at the bottom 24 of plate 16 and closed at the top 22. Plate 16 also has an outlet passage 38 connecting the outlet opening 30 to the flow field 32.

The top 22 of plate 16, shown in FIG. 3A, is provided with a planar top sealing surface 34 along which the top 22 of plate 16 is sealed to the membrane 18 that is located between plate 16 and adjacent bottom 24 of wet plate 14. The planar top sealing surface 34 extends continuously around the outer edges of the flow field 32, thereby completely surrounding the flow field 32, and also surrounding the gas diffusion layer 20 and shoulder 23, where applicable. The top sealing surface 34 of plate 16 includes a first bridging portion 46 which extends across the inlet passage 36 and a second bridging portion 48 which extends across the outlet passage 38. In these areas, the inlet passage 36 and the outlet passage 38 are closed at the top 22 of plate 16, and open at the bottom 24. These bridging portions 46, 48 allow a continuous seal to be provided along the top 22 of plate 16, while allowing the wet gas stream to flow between the outer peripheral edge surfaces of plate 16 and the central flow field 32.

As shown in FIG. 3B, the bottom 24 of plate 16 is provided with a planar bottom sealing surface 44 along which the bottom 24 of plate 16 is sealed to the top 22 of an adjacent dry plate 16, through membrane 18. The planar bottom sealing surface 44 extends continuously around the outer edges of the flow field 32, thereby completely surrounding the flow field 32, and also surrounding the gas diffusion layer 20 and shoulder 25, where applicable. The bottom sealing surface 44 includes a first bridging portion 40 which extends across the inlet passage 36 and a second bridging portion 42 which extends across the outlet passage 38. In these areas, the inlet passage 36 and the outlet passage 38 are closed at the bottom 24 of plate 16, and open at the top 22. These bridging portions 40, 42 allow a continuous seal to be provided along the bottom 24 of plate 16, while allowing the wet gas stream to flow between the outer peripheral edge surfaces of plate 16 and the central flow field 32.

The following description applies to both plates 14 and 16.

Figure 4:
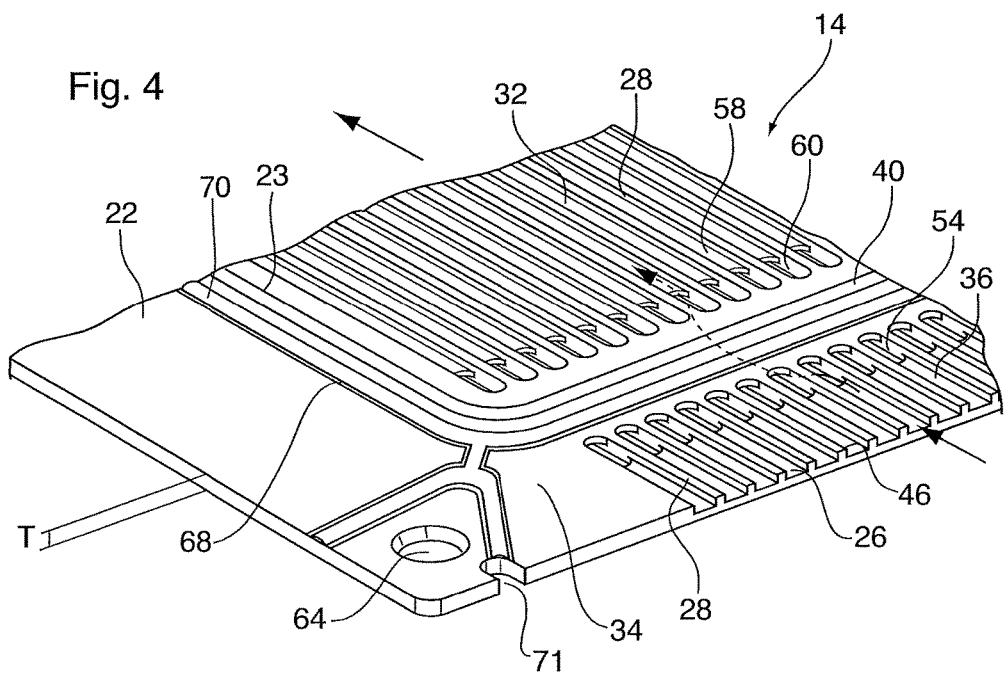
FIG. 4 is a top perspective view of a corner of the wet plate shown in FIGS. 2A and 2B, showing the inlet opening and passage.
Figure 5:
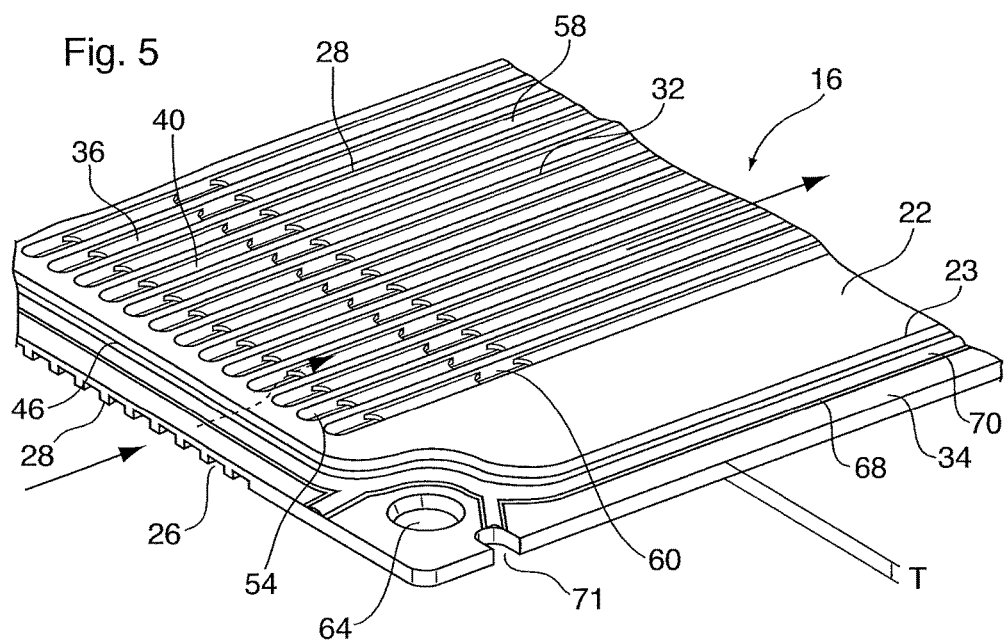
FIG. 5 is a top perspective view of a corner of the dry plate shown in FIGS. 3A and 3B, showing the inlet opening and passage.

The top and bottom sealing surfaces 34, 44 define areas in which the thickness of plate 14, 16 is equal to its maximum thickness. Sealing means are provided within the top and bottom sealing surfaces 34, 44 along which adjacent plates 14, 16 and membranes 18 are sealed together in the stack. For example, as shown in FIGS. 4 and 5, both the top and bottom sealing surfaces 34, 44 may each be provided with a shallow groove 68, having a similar depth as the pocket for the gas diffusion layer 20. Within this groove 68 is provided a sealing material 70 of pre-determined compressibility. The sealing material 70 may be applied by various methods, for example by silk screening, printing, liquid injection molding or high consistency molding.

Figure 8:
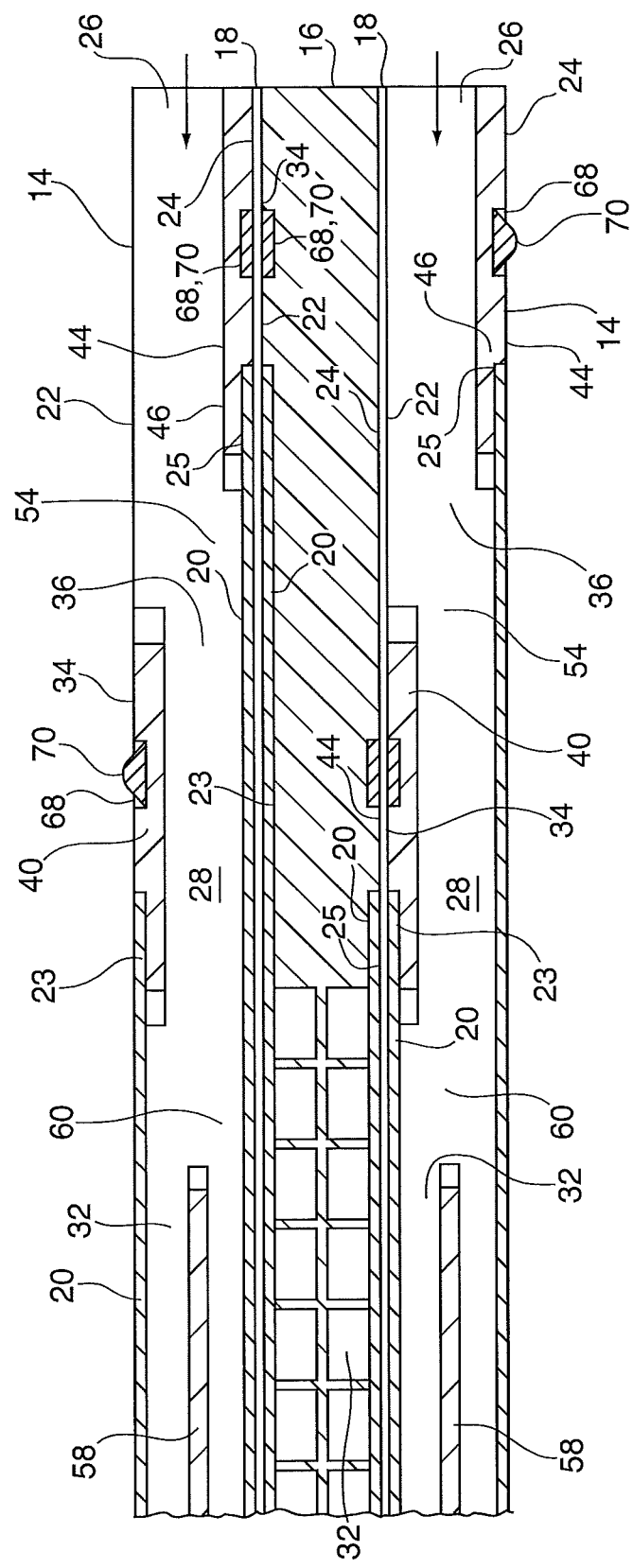
FIG. 8 is a cross section through a portion of the core of the humidifier of FIG. 1, showing portions of two wet plates and one dry plate.

As shown in FIGS. 4 and 5, the sealing material 70 may initially appear as a thin bead which is narrower and higher than the groove 68, such that it protrudes above groove 68. However, as shown in FIG. 8, during assembly of the core 12, adjacent plates 14, 16 are pressed together, thereby compressing the sealing material 70 to an extent such it spreads into groove 68 and such that the portions of sealing surfaces 34, 44 on either side of groove 68 come into contact with one another, thus providing a "hard stop", and limiting compression of the plates. This "hard stop" sealing feature assists in achieving consistent repeat cell spacing in the following manner. As the plates 14, 16 approach coming into contact with each other, the compressive forces tend to be equalized on all plates 14, 16 in the stack, to achieve consistent compression distances and thus equalized cell spacings. Moreover, the corner compression load transfer points (corner holes 64) are closely spaced to the perimeter seal 68, 70, and are themselves nearly surrounded by the same seal structure—so that relatively light compression loads are enough to accomplish stack assembly, and local bending deflections absolutely minimized, even using a relatively lightweight top (end) and bottom (end) fixture structure.

Although the above description of sealing makes reference to contact between the plates 14, 16, it will be appreciated that the membrane 18 between each pair of plates 14, 16 completely covers the flow fields as well as the top and bottom sealing surfaces 34, 44 of the plates 14, 16. Therefore, there is always a membrane 18 between plates 14, 16 in all areas where they are sealed together and each pair of plates 14, 16 is actually sealed to opposite sides of a membrane 18, rather than being sealed directly to each other. The gas diffusion layers 20, on the other hand, are smaller in area than the membranes 18, such that the gas diffusion layers 20 extend only over the flow field 32, inside shoulders 23, 25, and do not overlap the top and bottom sealing surfaces 34, 44. Therefore, the gas diffusion layers 20 are not present in areas of plates 14, 16 which are sealed together with membranes 18.

The bridging portions 40, 42, 46, 48 must be sufficiently thin so as to avoid flow restriction in the openings 26, 30 and flow passages 36, 38, while providing sufficient bridge support, within a single plate structure of limited thickness. The thicknesses of the bridging portions depends on the thickness of the plates 14, 16, and typically varies from about 10 to about 50 percent of the plate thickness, or from about 0.07 mm to about 1.5 mm, depending on the plate thickness.

In plates 14, 16 the first bridging portion 40 is inwardly offset toward the flow field 32 relative to the first bridging portion 46 on the opposite side of plate 14, 16, such that there is no overlap between the first bridging portions 40, 46. In order to enhance flow through the inlet passage 36, the amount of offset may be further increased such that the outer edge of the first bridging portion 40 (facing away from flow field 32) is spaced apart from the inner edge of first bridging portion 46, creating a gap 54 through the plate, the gap being divided by ribs 28 into a series of small holes. It will be appreciated that the first bridging portion 46 extends to the edge surface in which inlet opening 26 is provided, and therefore forms the closed bottom of inlet opening 26 in plate 14 and the closed top of inlet opening 26 in plate 16.

Similarly, on the opposite sides of plates 14, 16, the second bridging portion 42 is inwardly offset toward the flow field 32 relative to the second bridging portion 48, such that there is no overlap between the second bridging portions 42, 48. In order to enhance flow through the outlet passage 38, the offset may be further increased such that the outer edge of the second bridging portion 42 (facing away from flow field 32) is spaced apart from the inner edge of second bridging portion 48, creating a gap 56 through the plate 14, the gap 56 being divided by ribs 28 into a series of small holes.

Offsetting the bridging portions 40, 46 and 42, 48 so as to eliminate overlap permits the inlet and outlet openings 26, 30 and the inlet and outlet passages 36, 38 to be formed as open grooves. This may enhance manufacturability of plates 14, 16 but is not necessary. In some embodiments of the invention, the first bridging portions 40, 46 may overlap or may be directly opposite to one another so that the inlet passage 36 is closed along at least part of its length by the top 22 and bottom 24 of plate 14, 16. Similarly, the second bridging portions 42, 48 may overlap or may be directly opposite to one another so that the outlet passage 38 is closed along at least part of its length by the top 22 and bottom 24 of plate 14, 16.

As mentioned above, the support ribs 28 extend throughout the flow field 32 in order to provide support for the membrane 18 and the gas diffusion layers 20. In order to maximize flow and water vapour transfer, the support ribs 28 are very thin and must be supported laterally in order to prevent them from being pushed over (tipping) or bending along their length. Therefore, webs 58 are provided between adjacent ribs 28 to keep the ribs 28 in position. The webs 58 are very thin, and may be made as thin as possible within constraints of manufacturability. The webs typically have a thickness of from about 0.07 to about 0.5 mm, and may for example have a thickness of about 0.11 mm. The webs 58 in humidifier 10 are located in a plane which is intermediate between the top 22 and bottom 24 of plate 14 and which may, for example, be located in a central plane located midway between the top 22 and bottom 24 of plate 14, 16. In humidifier 10, each web 58 extends parallel to ribs 28 across the flow field 32, terminating at a short distance from the first bridging portion 40 to form a gap 60 which is divided by ribs 28 into a series of small holes extending through the plate 14. Similarly, each web 58 terminates at a short distance from the second bridging portion 42 to form a gap 62 which is divided by ribs 28 into a series of small holes extending through the plate 14. Gaps 60 and 62 are also referred to herein as a "dive-through openings" because they extend through the plate 14, 16 and provide flow communication between the open top and open bottom of flow field 32 and the inlet and outlet passages 36, 38.

The provision of gap 60 permits flow of the wet gas stream from the inlet passage 36 to both sides of plate 14, 16 in flow field 32, such that the flow of the wet gas stream is split substantially equally above and below the webs 58, i.e. to the open top and open bottom of flow field 32. Similarly, the provision of gap 62 permits flow from above and below the webs 58, i.e. from the open top and open bottom of flow field 32, to enter the outlet passage 38.

Figure 7:
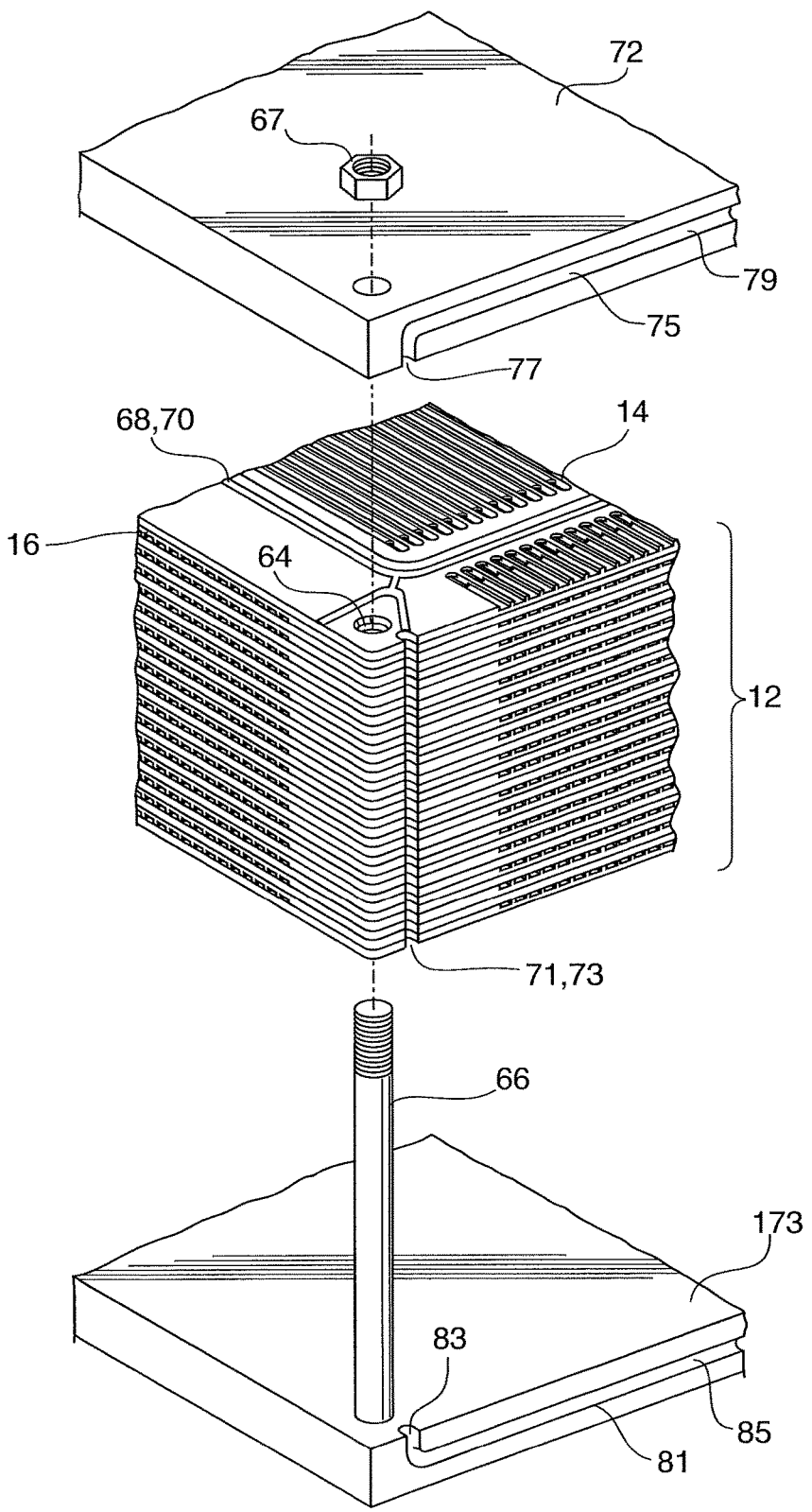
FIG. 7 is an exploded perspective view of a portion of the core of the humidifier of FIG. 1 between two end plates.

The wet and dry plates 14, 16 are provided with holes 64 at their corners to receive elongate fasteners such as bolts, rods, studs or cables, with bolt 66 and nut 67 being shown in FIG. 7. Also shown in FIG. 7, the core 12 may be assembled between a pair of structural end plates 72, 173 by alternately stacking wet plates 14 and dry plates 16, with membranes 18 and gas diffusion layer(s) 20 being provided between each pair of adjacent wet plates 14 and dry plates 16. Once the stack is formed, the core 12 is compressed to seal the plates 14 and 16 to each side of their shared membrane 18, as described above, such that the membrane 18 is sandwiched between plates 14 and 16, and is maintained in compression by the fasteners, such as bolts 66 and nuts 67.

Since stiffness is required only along the seal paths at the edges of the plates 14, 16, it will be appreciated that the relatively thick end plates 72, 173 may be replaced by a more lightweight fixture. For example, the middle portions of the end plates 72, 173 may be removed so as to provide a thick, rigid end perimeter frame, which may incorporate smaller size ribs or a truss like structure.

As shown in FIG. 7, the sealing grooves 71 in stacked plates 14, 16 align to form a continuous groove 73 extending throughout the height of core 12. The grooves 71 communicate with the sealing grooves 68 and the sealing material 70 contained therein, to provide continuous sealing to the edge of grooves 71. As shown, top end plate 72 has a groove 75 including a leg 77 which aligns with groove 73, and an elongate portion 79 extending across an edge of the plate 72. Although not shown, the groove 75 is continuous, with the elongate portion 79 extending to the other end of plate 72 and with another leg 77 (not shown) communicating with a groove 73 formed at the other end of core 12. Similarly, the bottom end plate 173 is provided with a groove 81 including a leg 83 which aligns with groove 73, and an elongate portion 85 extending across an edge of the plate 173. Although not shown, the groove 81 is continuous, with the elongate portion 85 extending to the other end of plate 173 and with another leg 83 communicating with a groove 73 formed at the other end of core 12. Therefore, along at least one face of the assembly comprising core 12 and end plates 72, 173, there is a continuous rectangular groove to receive a sealing element such as an O-ring for sealing a manifold to the core 12.

Referring now to FIGS. 16A and 16B, to assist in assembling and maintaining alignment of the plates 14, 16 during assembly, the plates 14, 16 may be provided with male and female snap fit elements. These snap fit elements may conveniently be provided at the holes 64. For example, as shown in FIGS. 16A and 16B, the top 22 of each plate 14, 16 may be provided with annular protrusions 120 surrounding holes 64, and the bottom 24 of each plate 14, 16 may be provided with annular recesses 122 surrounding holes 64, the annular recesses 122 being of sufficient size and depth to receive the annular protrusions 120 of an adjacent plate 14, 16 with a snap fit. It will be appreciated that the snap fit elements do not in themselves apply sufficient stack compression loads, although individual pairs of plates 14, 16 might be pre-assembled in this way, for example by using a staking step. Therefore, the stack will typically require an elongate fastener to accomplish stack compression and assembly, even where snap fit elements are provided.

As shown in the drawings, the inlet and outlet openings of the wet and dry plates 14, 16 can be seen along four of the faces of the core 12. These four faces of core 12 are sealed to, and covered by manifolds which provide flow communication between the inlet and outlet openings of plates 14, 16 and other components of the fuel cell system.

In particular, as shown in FIG. 1, a wet gas stream inlet manifold 74 covers the face of core 12 along which the inlet openings 26 of the wet plates 14 are provided. The wet gas stream inlet manifold 74 is sealed at one end to the core 12 and is sealed at its other end to a conduit (not shown) which connects the manifold 74 to the exhaust port of the fuel cell cathode (not shown).

A wet gas stream outlet manifold 76 covers the face of core 12 along which the outlet openings 30 of the wet plates 14 are provided, and which is directly opposite to the face along which the inlet openings 26 are provided. The wet gas stream outlet manifold 76 is sealed at one end to the core 12 and is sealed at its other end to a conduit (not shown) which either exhausts the cathode exhaust gas from the fuel cell system, or which leads to another component of the fuel cell system in which the cathode exhaust is recycled or subjected to further processing before it is exhausted from the system.

A dry gas stream inlet manifold 78 covers the face of core 12 along which the inlet openings 26 of the dry plates 16 are provided. The dry gas stream inlet manifold 78 is sealed at one end to the core 12 and is sealed at its other end to a conduit (not shown) which connects the manifold 74 to a source of ambient air. As explained above, the ambient air may first be compressed and cooled before it enters the humidifier 10, and therefore the manifold 78 may be connected to a conduit (not shown) which is connected to the outlet of an air compressor (not shown) or to the outlet of a charge air cooler (not shown) located downstream of the compressor.

A dry gas stream outlet manifold 80 covers the face of core 12 along which the outlet openings 30 of the dry plates 14 are provided, and which is directly opposite to the face along with the inlet openings 26 of dry plates 16 are provided. The dry gas stream outlet manifold 80 is sealed at one end to the core 12 and is sealed at its other end to a conduit (not shown) which carries the moistened air to the fuel cell (not shown) where it is reacted with the fuel.

The manifolds 74, 76, 78, 80 may either be directly attached to the core 12, or may be attached to a housing (not shown) in which the core 12 is enclosed.

A humidifier 110 according to a second embodiment is now described below with reference to FIGS. 9 and 10. Humidifier 110 is identical to humidifier 10 above in all respects, except for the differences noted below, and therefore the description of the elements of humidifier 10 applies equally to humidifier 110, unless otherwise stated. Also, in the drawings and in the following description, like elements of humidifiers 10 and 110 are identified by like reference numerals.

The humidifier 110 according to the second embodiment comprises a core 12 which is constructed from wet and dry plates 14, 16, membranes 18 and gas diffusion layers 20. The wet and dry plates 14, 16 used in the core 12 of humidifier 110 are identical in all respects to the wet and dry plates 14, 16 of humidifier 10, except for the construction of the flow field 32. In humidifier 110, the flow fields 32 of the plates 14, 16 are traversed by support ribs 28, and adjacent ribs 28 are connected by webs 82. In contrast to the elongate webs 58 of humidifier 10, which cover substantially the entire flow field 32 in humidifier 10, the webs 82 are shorter and are intermittently spaced along the lengths of the ribs 28, leaving additional gaps 84 between adjacent ribs 28. These gaps 84 provide additional areas of communication between gases flowing along the top and bottom regions of each plate 14, 16. The respective areas covered by webs 82 and gaps 84 are variable, and it can be seen that the webs 82 can be shortened and the gaps 84 enlarged to the point that the flow field 32 has a mesh-like appearance, such that there is substantially continuous communication between gas flowing along the top and bottom regions of the plate 14, 16. It will be appreciated that gaps 84 also function as "dive-through" openings, similar to gaps 60, 62 described above.

In the illustrated humidifier 110, a plurality of relatively short webs 82 is provided along the length of each rib 28 traversing the flow field 32. Webs 82 located between adjacent pairs of ribs 28 may be aligned with one another in a direction which is transverse to the direction of the ribs 28, although this is not necessarily the case. Like webs 58, the webs 82 may each be located in a plane which is intermediate between the tops 22 and bottoms 24 of the plates 14, 16, however, this is not necessary. Rather, each of the webs 82 could be aligned with the top 22 or bottom 24 of the plate 14, 16.

A humidifier 210 according to a third embodiment is now described below with reference to FIGS. 11-15. Humidifier 210 is a cross-flow humidifier and is identical to humidifier 10 in all respects, except as noted below. Therefore the description of the elements of humidifier 10 applies equally to humidifier 210, unless otherwise stated. Also, in the drawings and in the following description, like elements of humidifiers 10 and 210 are identified by like reference numerals.

Humidifier 210 differs from humidifier 10 in that the inlet and outlet manifolds for the wet and dry gases are integrally formed as part of the core 12. This avoids the need to provide separately formed, external manifolds 74, 76, 78, 80 which must be sealed to the core. In order to provide integral manifolds, each wet and dry plate 14, 16 making up humidifier 210 includes manifold openings which, when the plates 14, 16 are stacked, will form the respective inlet and outlet manifolds for the wet and dry gas streams. The plates 14, 16 of humidifier 210 are now described below.

Firstly, as can be seen from the drawings, the wet and dry plates 14, 16 making up humidifier 210 include all of the same elements as the wet and dry plates 14, 16 of humidifier 10. In addition, each plate 14, 16 includes extensions along its four sides in which the four manifold openings are provided.

Figure 11:
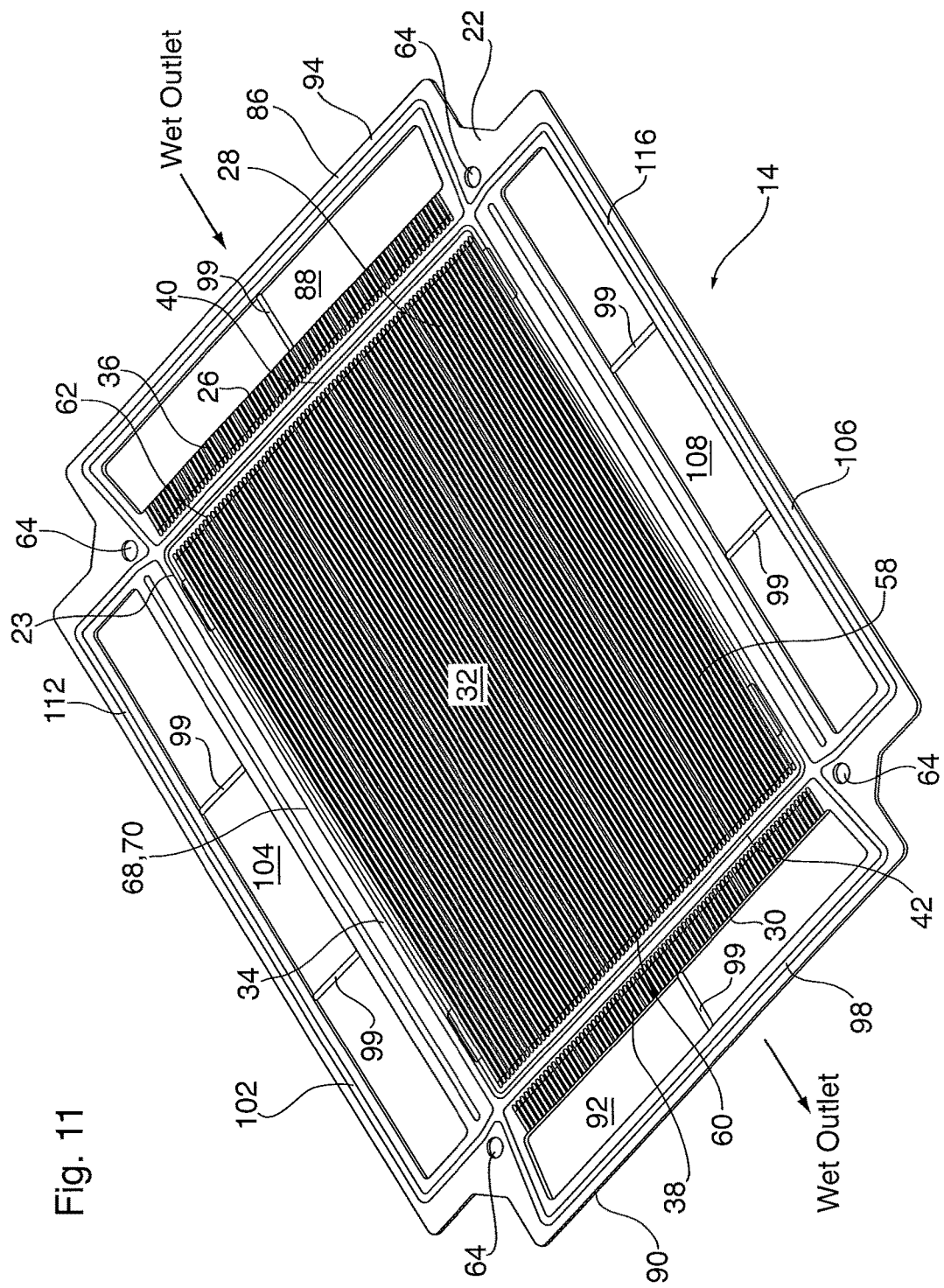
FIG. 11 is a top perspective view of a wet plate of a humidifier according to a third embodiment.
Figure 12:
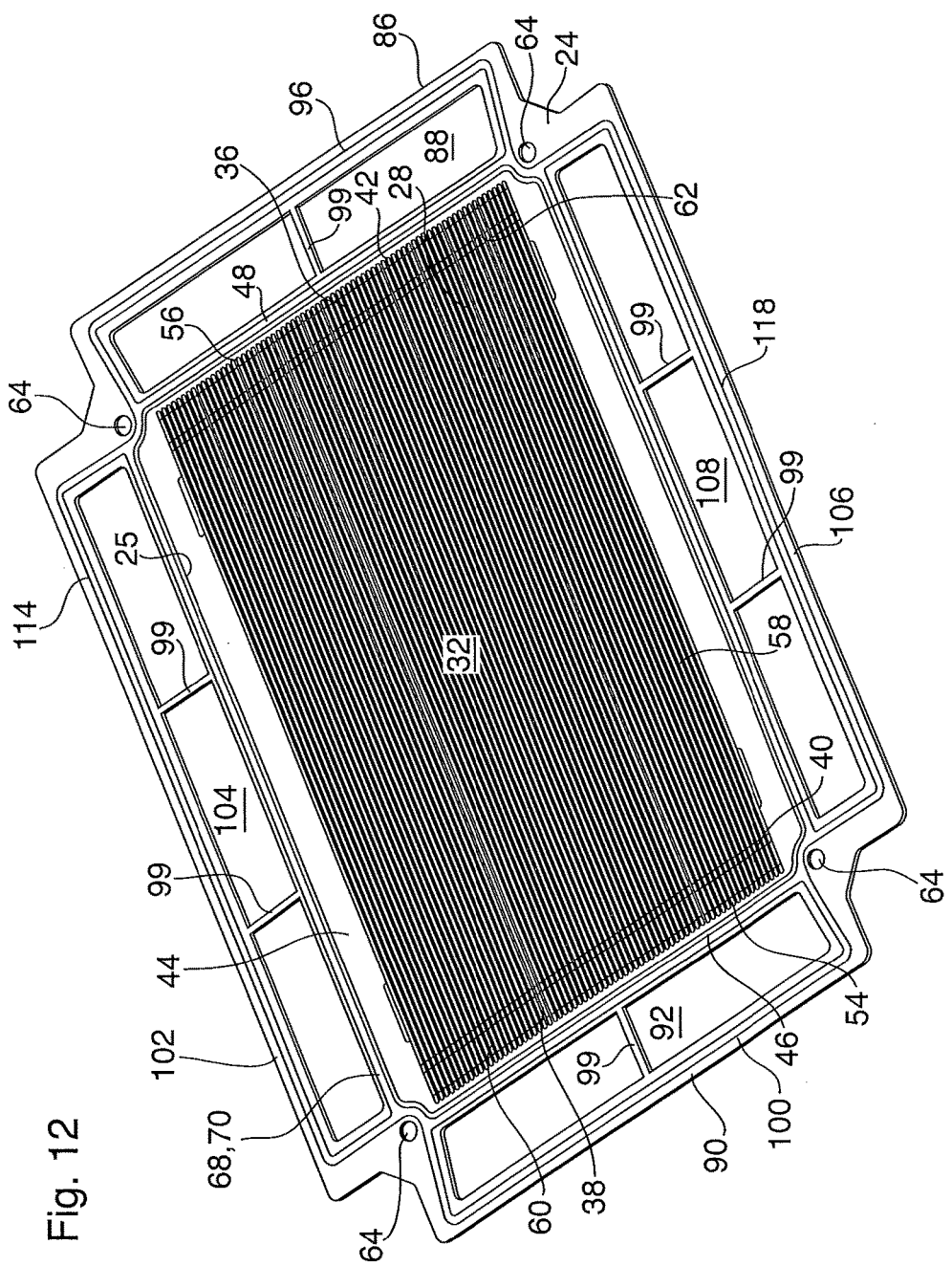
FIG. 12 is a bottom perspective view of the wet plate.

For example, FIGS. 11 and 12 respectively show the top 22 and bottom 24 of a wet plate 14 of humidifier 210. Extending from the opposite short sides of plate 14 are a pair of wet manifold extensions, namely a wet inlet manifold extension 86 defining a wet inlet manifold opening 88, and a wet outlet manifold extension 90 defining a wet outlet manifold opening 92. The wet inlet manifold opening 88 is in flow communication with the inlet opening 26 of the wet plate 14 along its entire length, and therefore the wet inlet manifold extension 86 extends along substantially the entire length of the side of plate 14 in which the inlet opening 26 is provided. The wet inlet manifold extension 86 has a top sealing surface 94 which is coplanar with the top sealing surface 34 of plate 14, and a bottom sealing surface 96 which is coplanar with the bottom sealing surface 44 of plate 14. The top and bottom sealing surfaces 94, 96 become sealed to wet manifold extensions of adjacent dry plates 16, discussed below, during assembly of the humidifier 210.

Similarly, the wet outlet manifold opening 92 of plate 14 is in flow communication with the outlet opening 30 of the wet plate 14 along its entire length, and the wet outlet manifold extension 90 extends along substantially the entire length of the side of plate 14 in which the outlet opening 30 is provided. The wet outlet manifold extension 90 has a top sealing surface 98 which is coplanar with the top sealing surface 34 of plate 14, and a bottom sealing surface 100 which is coplanar with the bottom sealing surface 44 of plate 14. The top and bottom sealing surfaces 98, 100 become sealed to wet manifold extensions of adjacent dry plates 16, discussed below, during assembly of the humidifier 210.

Therefore, in the wet plate 14 of humidifier 210, the inlet opening 26 and outlet opening 30 are formed in edge surfaces of plate 14 which open into the respective wet inlet manifold opening 88 and the wet outlet manifold opening 92. This is contrasted with the wet plate 14 of humidifier 10 in which the inlet and outlet openings 26, 30 are formed in edge surfaces located along the outer peripheral edges of the plate 14.

The wet plate 14 of humidifier 210 is also provided with a pair of dry manifold extensions along opposite long sides of the plate 14, namely a dry inlet manifold extension 102 defining a dry inlet manifold opening 104, and a dry outlet manifold extension 106 defining a dry outlet manifold opening 108. The dry inlet and outlet manifold openings 104, 108 are not in flow communication with the flow field 32 of wet plate 14. Rather, the dry manifold extensions 102, 106 merely act as filler pieces in the construction of the dry inlet and outlet manifolds, discussed below. The dry inlet manifold extension 102 has a top sealing surface 112 which is coplanar with the top sealing surface 34 of plate 14, and a bottom sealing surface 114 which is coplanar with the bottom sealing surface 44 of plate 14. The top and bottom sealing surfaces 112, 114 become sealed to dry manifold extensions of adjacent dry plates 16, discussed below, during assembly of the humidifier 210.

The dry outlet manifold extension 106 similarly has a top sealing surface 116 which is coplanar with the top sealing surface 34 of plate 14, and a bottom sealing surface 118 which is coplanar with the bottom sealing surface 44 of plate 14. The top and bottom sealing surfaces 116, 118 become sealed to dry manifold extensions of adjacent dry plates 16, discussed below, during assembly of the humidifier 210.

The manifold extensions 86, 90, 102 and 106 may each be provided with one or more strengthening ribs 99 so as to maintain the shapes of the respective openings 88, 92, 104, 108 under internal service pressure. It will be appreciated that the sealing surfaces 34, 44 of the manifold extensions may be provided with grooves 68 and sealing material 70, as in the remaining portions of the top and bottom sealing surfaces 34, 44 of plate 14.

Figure 13:
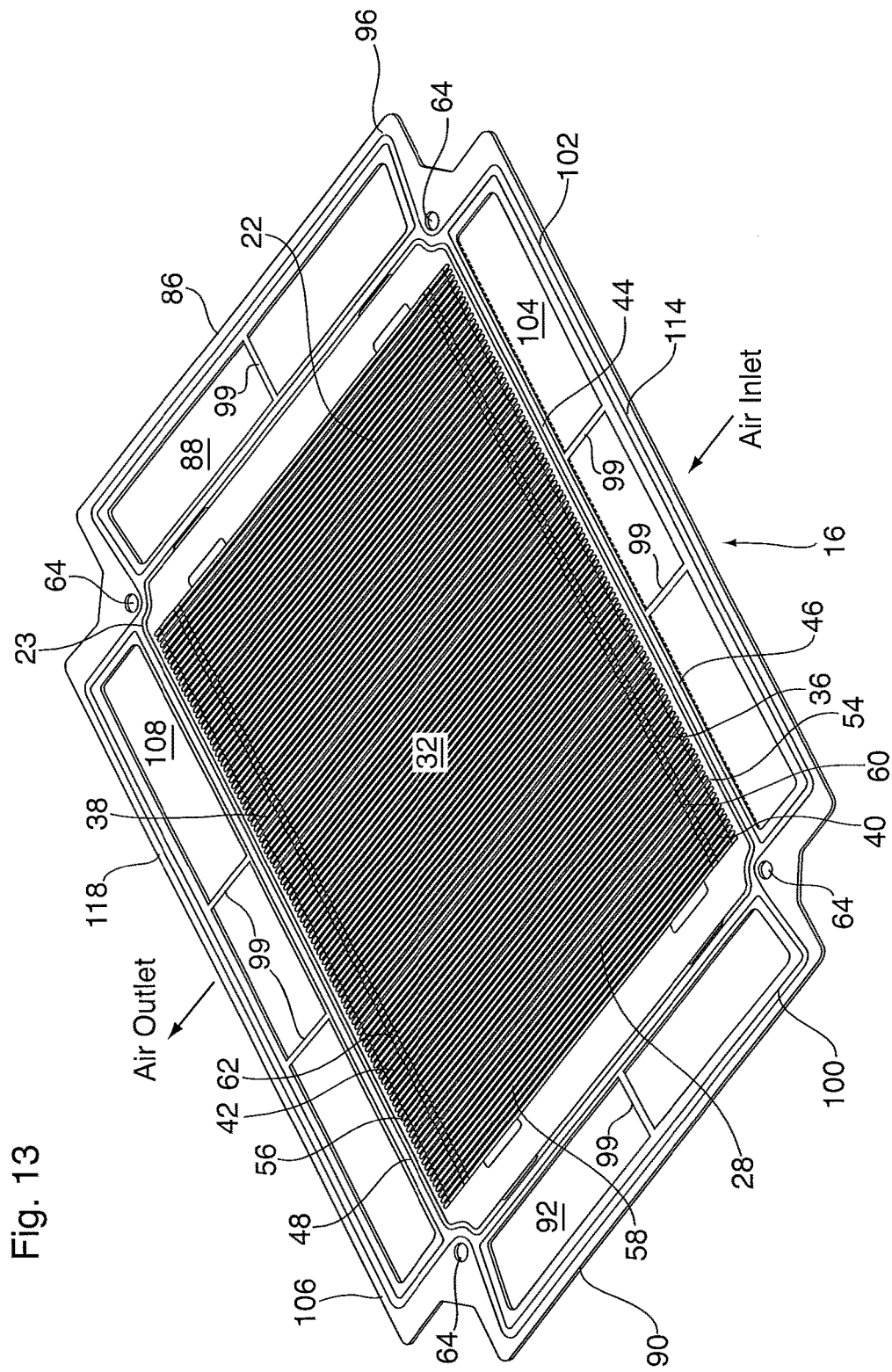
FIG. 13 is a top perspective view of a dry plate of a humidifier according to a third embodiment.
Figure 14:
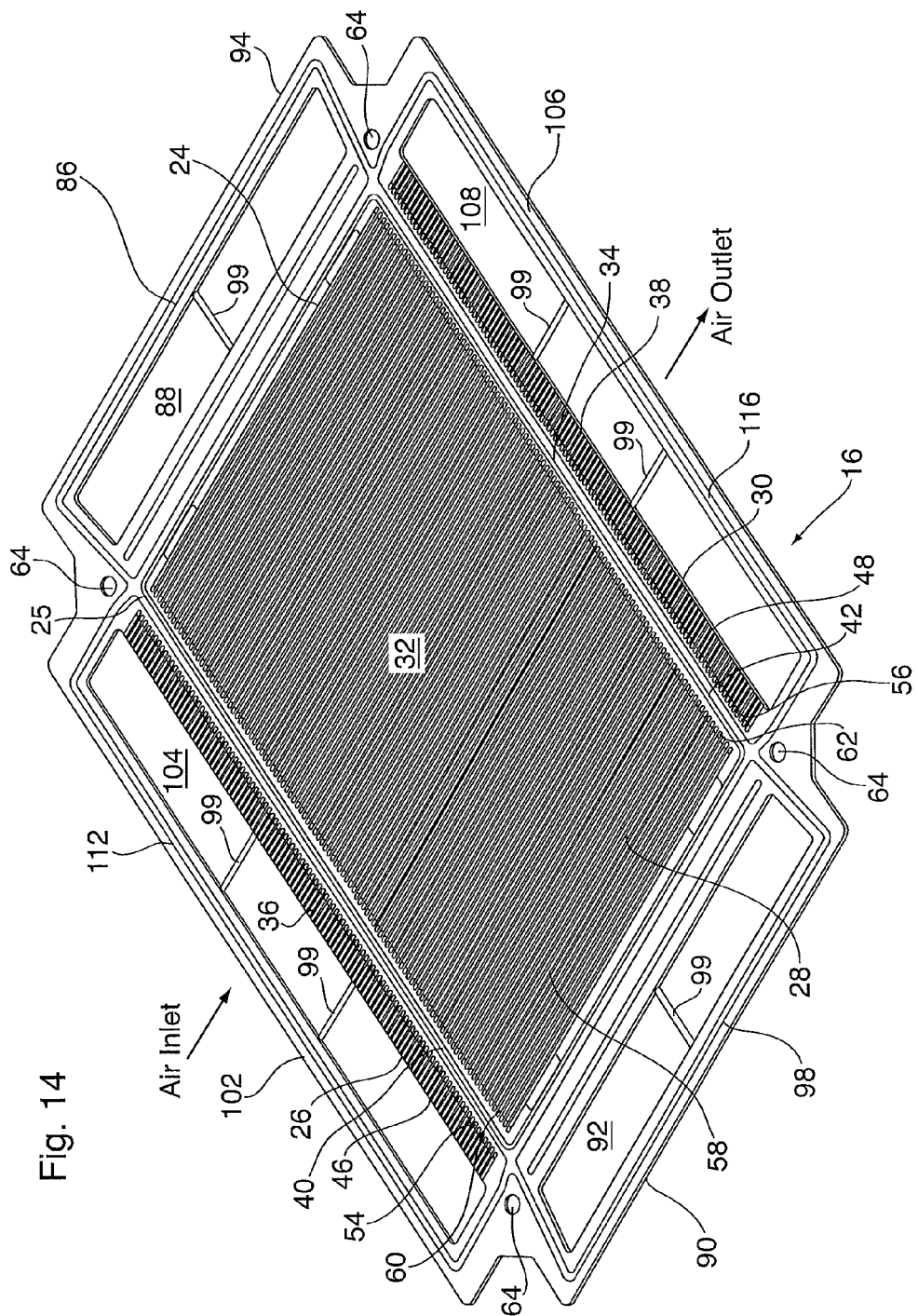
FIG. 14 is a bottom perspective view of the dry plate.

FIGS. 13 and 14 respectively show the top 22 and bottom 24 of a dry plate 16 of humidifier 210. Dry plates 16 are also provided with manifold extensions and openings which are of the same configuration as those of the wet plates 14, with the exceptions noted below. Therefore, like elements of dry plates 16 of humidifier 210, including the manifold extensions, are referred to in the drawings and the following description with like reference numerals.

Each of the dry plates 16 includes dry inlet and outlet manifold extensions 102, 106 extending along opposite long sides of the plate 16, which define the respective dry inlet and outlet manifold openings 104, 108 in plate 16. The dry inlet manifold opening 104 of plate 16 is in flow communication with the inlet opening 26, and the dry outlet manifold opening 108 is in flow communication with the outlet opening 30.

When the wet and dry plates 14, 16 are stacked to form humidifier 210, the wet manifold extensions 86, 90 of the wet and dry plates become sealed to one another along the sealing surfaces. The wet inlet manifold openings 88 of the wet and dry plates 14, 16 combine to form a wet inlet manifold space extending throughout the height of the humidifier 210, wherein all the wet inlet openings 26 of the wet plates 14 are in flow communication with the interior of the wet inlet manifold space. Similarly, the wet outlet manifold openings 92 of the wet and dry plates 14, 16 combine to form a wet outlet manifold space extending throughout the height of the humidifier 210, wherein all the wet outlet openings 30 of the wet plates 14 are in flow communication with the interior of the wet outlet manifold space.

Also, in humidifier 210, the dry inlet manifold openings 104 of the wet and dry plates 14, 16 combine to form a dry inlet manifold space extending throughout the height of the humidifier 210, wherein all the dry inlet openings 26 of the dry plates 16 are in flow communication with the interior of the dry inlet manifold space. Similarly, the dry outlet manifold openings 108 of the wet and dry plates 14, 16 combine to form a dry outlet manifold space extending throughout the height of the humidifier 210, wherein all the dry outlet openings 30 of the dry plates 16 are in flow communication with the interior of the dry outlet manifold space. As with humidifier 10 above, the core 12 of humidifier 210 will be compressed between end plates which will differ somewhat in appearance from end plates 72, 173 described above in that apertures will be provided in the end plates, communicating with the manifold spaces, and fittings will be provided over these openings for connection to other components of the fuel cell system. One or both ends of each manifold space will be open through the end plates.

All embodiments described above and shown in the drawings relate to cross-flow humidifiers. It may be advantageous, in some embodiments of the invention, to provide humidifiers in which the wet and dry gas streams are in a counter-flow orientation (flowing in opposite directions), or in a co-flow orientation (flowing in the same direction), and such configurations can be obtained by changing the orientation and/or flow direction in the wet plates 14 or dry plates 16.

A humidifier 310 according to a fourth embodiment of the invention is described below, in which the wet and dry gas streams are in a counter-flow or co-flow orientation relative to one another.

Except where noted below, the elements of humidifier 310 are identical to the elements of humidifiers 10 and/or 210 described above. Therefore the description of the elements of humidifiers 10 and 210 apply to humidifier 310, unless otherwise stated, and like elements of humidifier 310 are identified by like reference numerals in the drawings and in the following description. Also, FIGS. 17A, 17B, 18A and 18B are somewhat simplified by omitting details which are unnecessary to explain the features of this embodiment. For example, omitted from the drawings are the shallow groove 68 and compressible sealant 70, the shoulders 23, 25 to receive the diffusion layers 20, and the apertures 64 through which the plates are joined together. It will be appreciated that these elements may be present in the plates making up the humidifier according to the fourth embodiment.

Humidifier 310 comprises a core which is constructed from a stack of wet plates 314 and dry plates 316 in alternating order. As in humidifier 210, the inlet and outlet manifolds for the wet and dry gases in humidifier 310 are integrally formed with the core, with each plate 314, 316 including a wet inlet manifold opening 88, a wet outlet manifold opening 92, a dry inlet manifold opening 104 and a dry outlet manifold opening 108. In order to permit counter- or co-flow of the gas streams, each end of the plate 314, 316 is provided with a wet manifold opening next to a dry manifold opening. Top and bottom views of wet plate 314 are shown in FIGS. 17A and 17B, and top and bottom views of dry plate 316 are shown in FIGS. 18A and 18B.

In the illustrated embodiment, in which counter-flow of the wet and dry gas streams is produced, the wet inlet manifold opening 88 is located at the same end of plate 314, 316 as the dry outlet manifold opening 108 and the wet outlet manifold opening 92 is located at the opposite end of the plate, adjacent to the dry inlet manifold opening 102. To change to co-flow, the flow of either the wet or dry gas stream is reversed from the direction shown in the drawings.

Also, in the plates 314 and 316 of humidifier 310 illustrated in the drawings, the inlet and outlet manifold openings 88, 92 for the wet gas stream are located at directly opposite ends of the plates 314, 316, and the inlet and outlet manifold openings 104, 108 for the dry gas stream are similarly located at directly opposite ends of plates 314, 316. Rather than this arrangement, it is possible to change the locations of the openings such that the inlet and outlet manifold openings 88, 92 for the wet gas stream are located at diagonally opposite corners relative to one another, and so that the inlet and outlet manifold openings 104, 108 for the dry gas stream are likewise located at diagonally opposed corners. The location of inlet and outlet manifold openings at diagonally opposed corners may reduce dead areas near the corners of the plates and may provide a more even pressure drop across the plate.

Figure 17A:
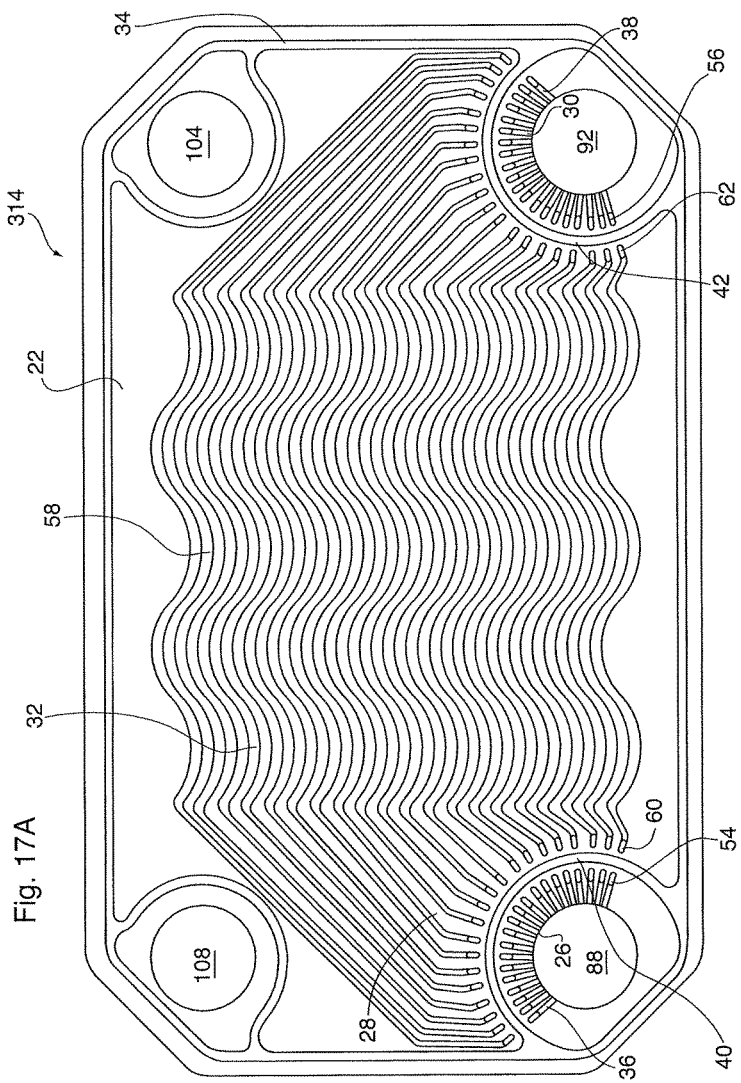
Figure 18A:
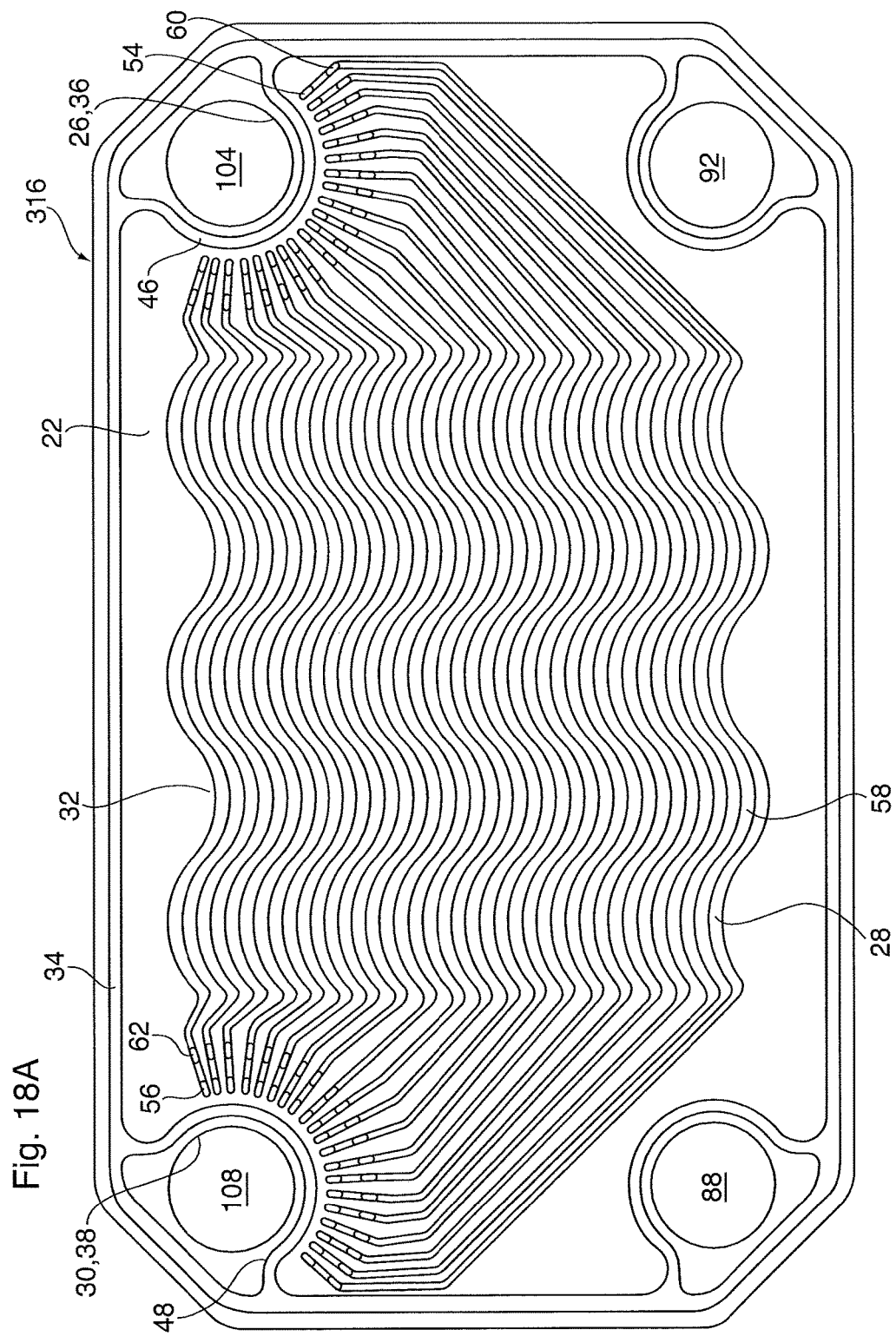
FIGS. 18A and 18B are plan views showing the top and bottom of the dry plate of the humidifier according to the fourth embodiment of the invention.
Figure 18B:
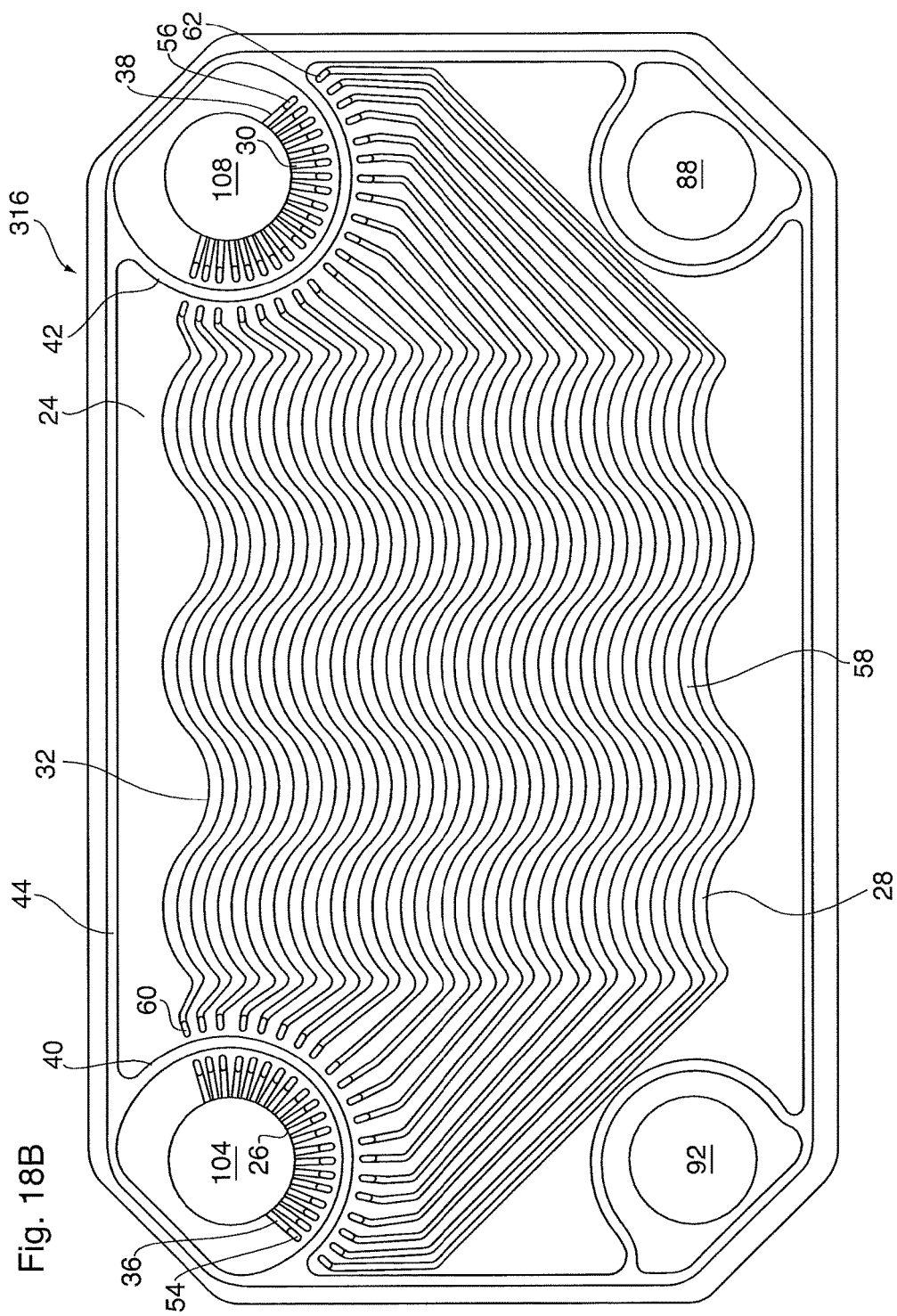

As shown in FIGS. 17A and 17B, the inlet opening 26 for the wet gas stream is located in an edge surface of plate 314 which opens into the wet inlet manifold opening 88. The inlet opening 26 is divided by a plurality of support ribs 28 which divide and support the inlet opening 26, and which radiate outwardly from the inlet opening toward the flow field 32, and which define the inlet passage 36 connecting the inlet opening 26 to flow field 32. Similarly, the outlet opening 30 for the wet gas stream is located in an edge surface of plate 14 which opens into the wet outlet manifold opening 92. The outlet opening 30 is divided by a plurality of support ribs 28 which divide and support the outlet opening 30, and which radiate away from the outlet opening toward the flow field 32, to define the outlet passage 38 connecting the outlet opening 30 to flow field 32. This is the same as the arrangement in the wet plate 14 of humidifier 10, except that the inlet and outlet openings 26, 30 are arranged along the curved surfaces of openings 88 and 92, and the support ribs 28 and passages 36, 38 radiate outwardly therefrom toward the flow field 32. It will be appreciated that the openings 88, 92, 102, 108 of plates 314, 316 are not necessarily circular, but may be of any suitable shape as determined by the requirements of any specific application.

As in humidifiers 10 and 210, the flow field 32 in each plate 314, 316 of humidifier 310 is traversed by support ribs 28 to provide support for the membrane 18 (not shown) and the gas diffusion layer(s) 20 (not shown). However, instead of having ribs 28 extending straight across the flow field, the ribs 28 extend across flow field 32 at an angle to the direction of fluid flow, having angled radiating portions extending away from the manifold openings 88, 92 adjacent to the ends of plates 314, 316, and having an undulating wave-like pattern in the central portions of plates 314, 316. For the sake of convenience, the ribs 28 of humidifier 310 are not shown to scale. The ribs 28 may be of similar thickness and similar in number to the ribs 28 of humidifier 10 described above.

The top 22 of plate 314 is provided with a planar top sealing surface 34 along which the top 22 of plate 14 is sealed to a membrane 18 located between plates 314 and 316, and dry plate 316 is sealed to the same membrane 18 along its respective bottom sealing surface 44. The planar top sealing surface 34 extends continuously around the outer edges of flow field 32, and also surrounds the gas diffusion layer 20 (not shown), where applicable. The top sealing surface 34 includes a first bridging portion 40 which extends across the inlet passage 36 and a second bridging portion 42 which extends across the outlet passage 38. In these areas, the inlet passage 36 and the outlet passage 38 are closed at the top 22 of plate 314, and open at the bottom 24. These bridging portions 40, 42 allow a continuous seal to be provided along the top 22 of plate 14, while allowing the wet gas stream to flow from the inlet opening and passage 26, 36, across the flow field 32, to the outlet passage and opening 38, 30. It will be seen that the top sealing surface 34 completely surrounds each of the manifold openings 88, 92, 102 and 108. Thus, the dry gas stream manifold openings 102, 108 are sealed against flow communication with the flow field 32 of plate 314, while flow communication between the wet gas stream manifold openings 88, 92 and the flow field is permitted only through respective inlet and outlet openings 26, 30.

The bottom 24 of wet plate 314, shown in FIG. 17B, is provided with a bottom sealing surface 44 along which the bottom 24 of wet plate 314 is sealed to the top 22 of an adjacent dry plate 316 through a membrane 18. The planar bottom sealing surface 44 extends continuously around the outer edges of flow field 32, and also surrounds the manifold openings 88, 92, 102, 108. The bottom sealing surface 44 includes a first bridging portion 46 which extends across the inlet passage 36 and a second bridging portion 48 which extends across the outlet passage 38. In these areas, the inlet and outlet passages 36, 38 are closed at the bottom 24 of plate 314, and open at the top 22. These bridging portions 46, 48 allow a continuous seal to be provided along the bottom 24 of plate 314.

Having described the top and bottom 22, 24 of wet plate 314, a detailed description of the top and bottom of dry plate 316, shown in FIGS. 18A and 18B, is unnecessary.

In plates 314, 316 the first bridging portion 46 is inwardly offset toward the flow field 32 relative to the first bridging portion 40, such that there is no overlap between bridging portions 40, 46, and may be offset to an extent such that a gap 54 is formed through the plate 314 or 316, the gap 54 being divided by ribs 28 into a series of small holes. Similarly, the second bridging portion 48 may be inwardly offset toward the flow field 32 relative to the second bridging portion 42, and may be offset to an extent such that a gap 56 is formed through the plate 314 or 316, the gap 56 being divided by ribs 28 into a series of small holes. In a radial cross-section extending from an edge of one of the openings 88, 92 in FIG. 17A or B, or extending radially from an edge of one of the openings 104, 108 in FIG. 18A or B, into the flow field 32, the plates will have substantially the same appearance as plates 14 and 16 shown in cross-section in FIG. 8.

The following discussion of the ribs 28 in the flow field 32 of dry plate 314 applies equally to wet plate 316. The wavy ribs 28 shown in the flow field 32 of dry plate 314 may have a height which is substantially the same as the thickness of plate 314, but which is typically less than the thickness of plate 314 in order to accommodate the thickness of the gas diffusion layer 20. For convenience, the pockets for receiving the gas diffusion layers 20 are not shown in the drawings relating to humidifier 310. In order to provide lateral support for ribs 28, continuous webs 58 may be provided in order to keep them in position relative to one another. The webs 58 are very thin, as described above with reference to humidifier 10, and extend between ribs 28 throughout flow field 32, terminating a short distance from the bridging portions 40 and 42 to form gaps 60 and 62, or "dive-through openings", which provide flow communication between the open top and open bottom of flow field 32 and the inlet and outlet passages 36, 38.

Figure 9:
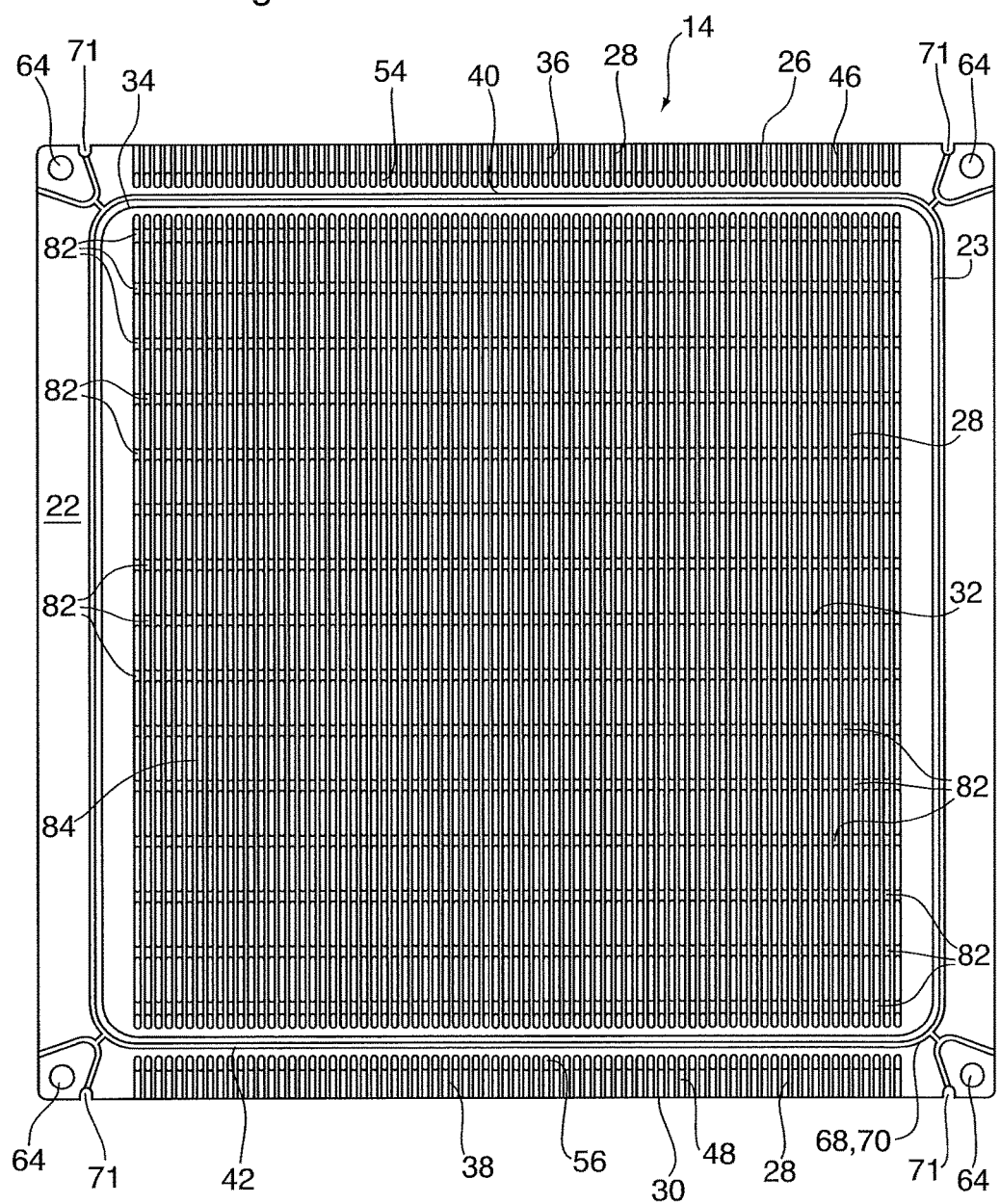
FIG. 9 is a top plan view of a wet plate of a humidifier according to a second embodiment.
Figure 10:
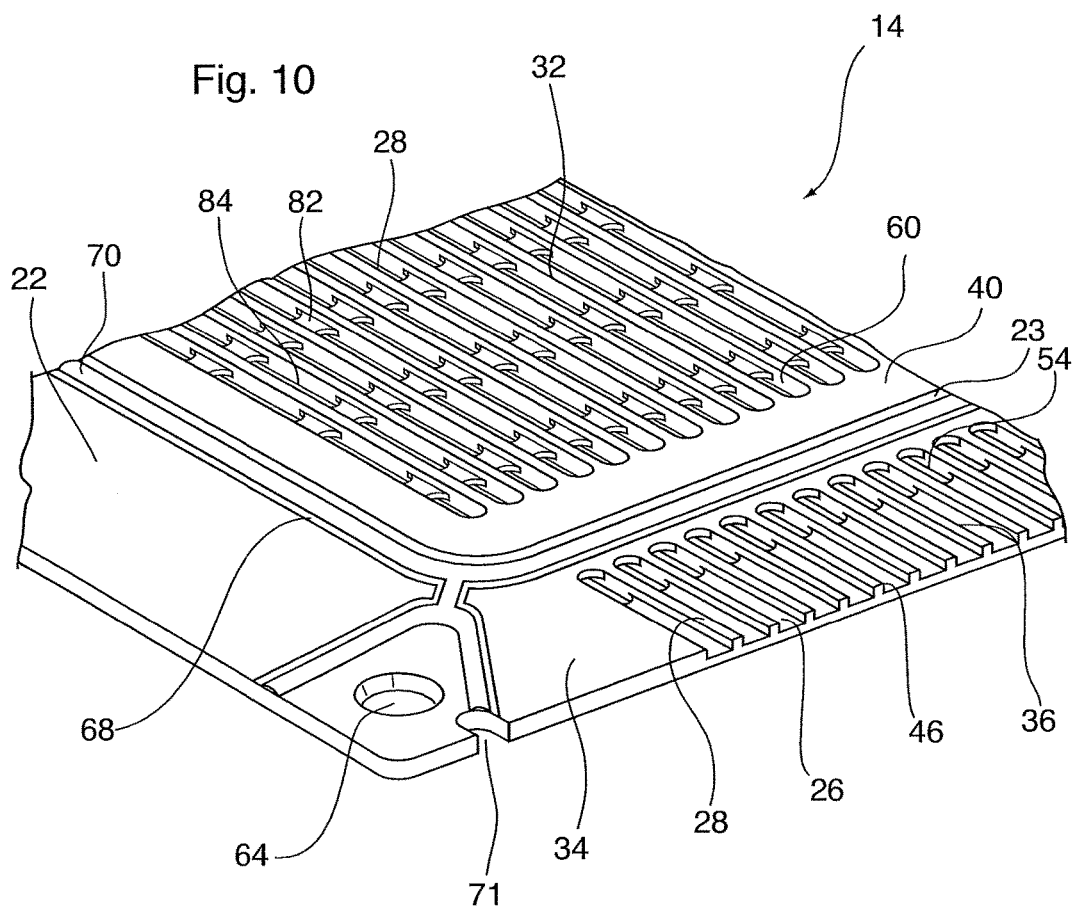
FIG. 10 is a top perspective view of a corner of the wet plate of FIG. 9.

Rather than having continuous webs 58, plate 314 may be provided with webs 82 as shown in FIGS. 9 and 10, webs 82 being shorter and are intermittently spaced along the lengths of the ribs 28, leaving additional gaps 84 between adjacent ribs 28. These gaps 84 provide additional areas of communication between gases flowing along the top and bottom regions of plate 314, and also function as "dive-through" openings. These discontinuous webs 82 may be provided between the wavy portions of ribs 28 located in the central portion of flow field 32, and between the radiating, predominantly straight portions of ribs 28 adjacent to the manifold openings in plates 314 and/or 316.

As in the cross-flow embodiments described above, it will be appreciated that the ribs 28 of wet plate 314 forms a criss-cross pattern with the ribs 28 of the adjacent dry plates 316. As can be seen by comparing the rib patterns of the wet and dry plates 314, 316, it can be seen that the radiating, predominantly straight portions of ribs 28 adjacent to the manifold openings 88, 92 in wet plate 314 will form a criss-cross, cross-hatched pattern with the predominantly straight portions of ribs 28 adjacent to the manifold openings 102, 108 in dry plate 316. Also, it can be seen that the undulating wave-like pattern in the central portion of the flow field 32 of wet plate 314 is "out of phase" with the pattern in the flow field 32 of dry plate 316 by about 90 degrees, thereby forming a criss-crossing arrangement. The criss-crossing of the ribs 28 is desirable in order to provide support for the ribs 28, the membrane 18 and the diffusion layers 20, and to prevent interleaving of the ribs 28 in adjacent plates which could potentially cause damage to the membrane 18 and the diffusion layers 20.

Figure 19:
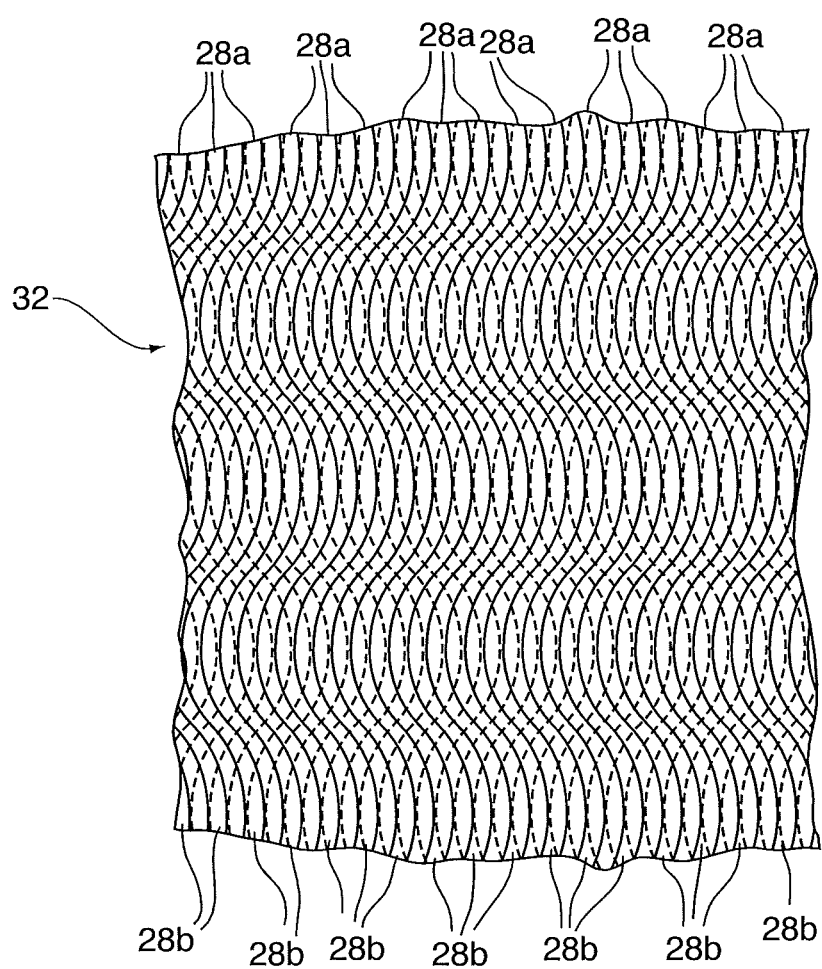
FIG. 19 shows a modified rib pattern for the humidifier according to the fourth embodiment of the invention.

It will also be appreciated that it is possible to modify the humidifier 310 according to the third embodiment by entirely eliminating the webs 54 or 82 between ribs 28, at least within the portion of flow field 32 in which the ribs 28 have an undulating wave-shape. In this case, the criss-cross pattern is formed within each plate by providing a first wave pattern, similar to that shown in FIG. 17A, in the top portion of plate 314, and a second, out of phase wave pattern, similar to that shown in FIG. 18A, in the bottom portion of plate 314. Thus, the upper portions of ribs 28 will criss-cross the lower portions of ribs 28, forming a pattern as shown in FIG. 19, which is a partial plan view of the flow field 32 of a wet or dry humidifier plate 314 or 316. In FIG. 19, the ribs in the upper portion of the plate are shown in solid lines and identified by reference 28a, and the ribs in the lower portion of the plate are shown in dotted lines and identified by reference 28b.

It will be appreciated that there are numerous possibilities for varying the directions of gas flow so as to provide cross-flow, co-flow or counter-flow of gases. Also, there are numerous possible arrangements of ribs, as well as numerous possible arrangements for inlet and outlet openings, either with or without integral manifold openings. A number of these variations have been described in detail above, and a few additional examples are more briefly described below.

Figure 20:
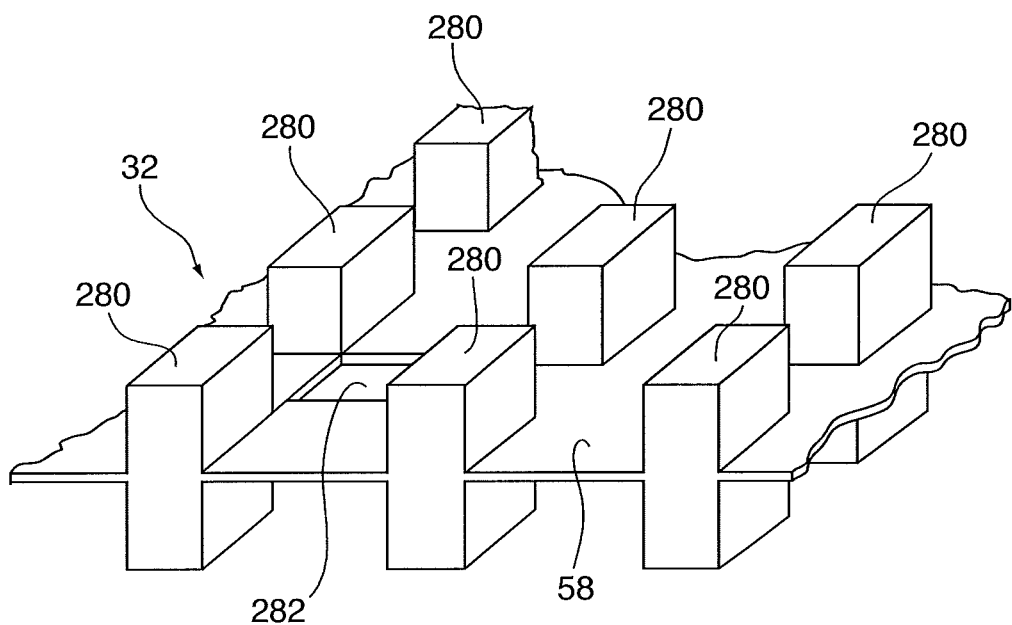
FIGS. 20 to 22 show variations in the flow field configuration in humidifiers according to the invention.

FIG. 20 shows a variation in which the flow field 32 of a wet or dry humidifier plate which can be used in any of the embodiments described herein. Each of the embodiments described above has a plurality of elongate, continuous support ribs 28. However, the use of continuous support ribs 28 is unnecessary in all embodiments of the invention. For example, as shown in FIG. 20, the ribs may be partially or completely replaced by rows of spaced-apart dimples 280. The dimples 280 may be connected by a web 58 as described above, which is shown in FIG. 20 as being located in a plane located approximately midway between the tops and bottoms of the dimples 280. The web 58 may either be continuous or may be interrupted by regularly or irregularly spaced perforations, such as perforation 282 shown in FIG. 20. The dimples 280 are shown in FIG. 21 as being regularly spaced in rows and having a block shape, but it will be appreciated that the spacing and shape of dimples 280 may be varied so long as they provide support for the membrane 18 and the diffusion layers 20.

Figure 21:
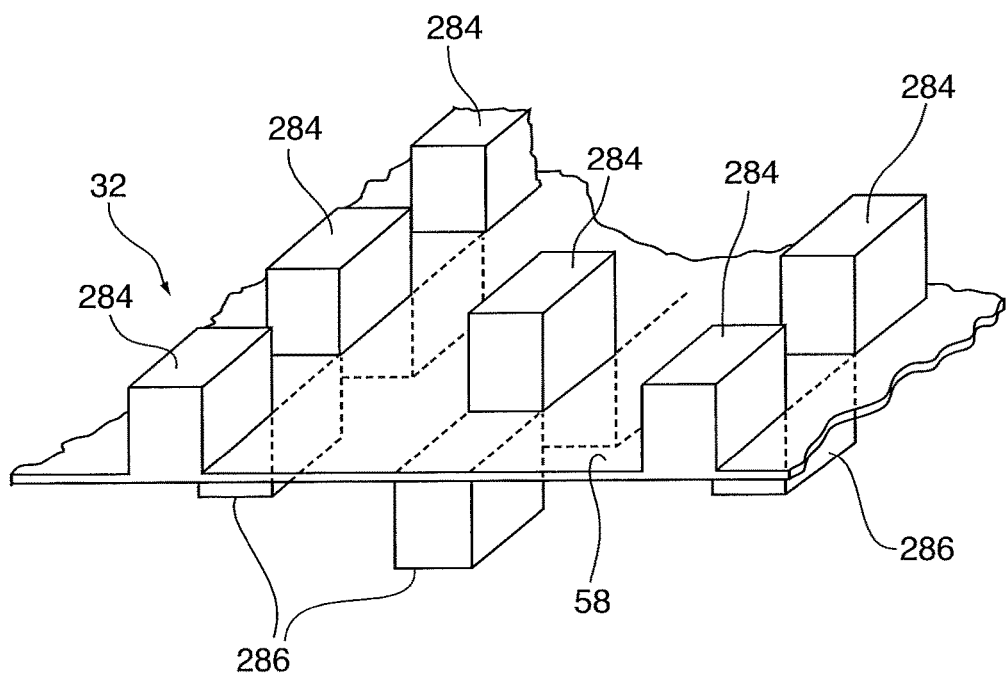

FIG. 21 shows another variation in which the flow field 32 of a wet or dry plate is provided with dimples connected by a continuous web 58. In contrast to the dimples 280 of FIG. 20, the flow field 32 of FIG. 21 is provided with spaced dimples 284 extending upwardly from the plane of web 58 and spaced dimples 286 extending downwardly from the plane of web 58. The comments regarding web configuration and dimple spacing and shape for FIG. 20 are also applicable to FIG. 21.

Figure 22:
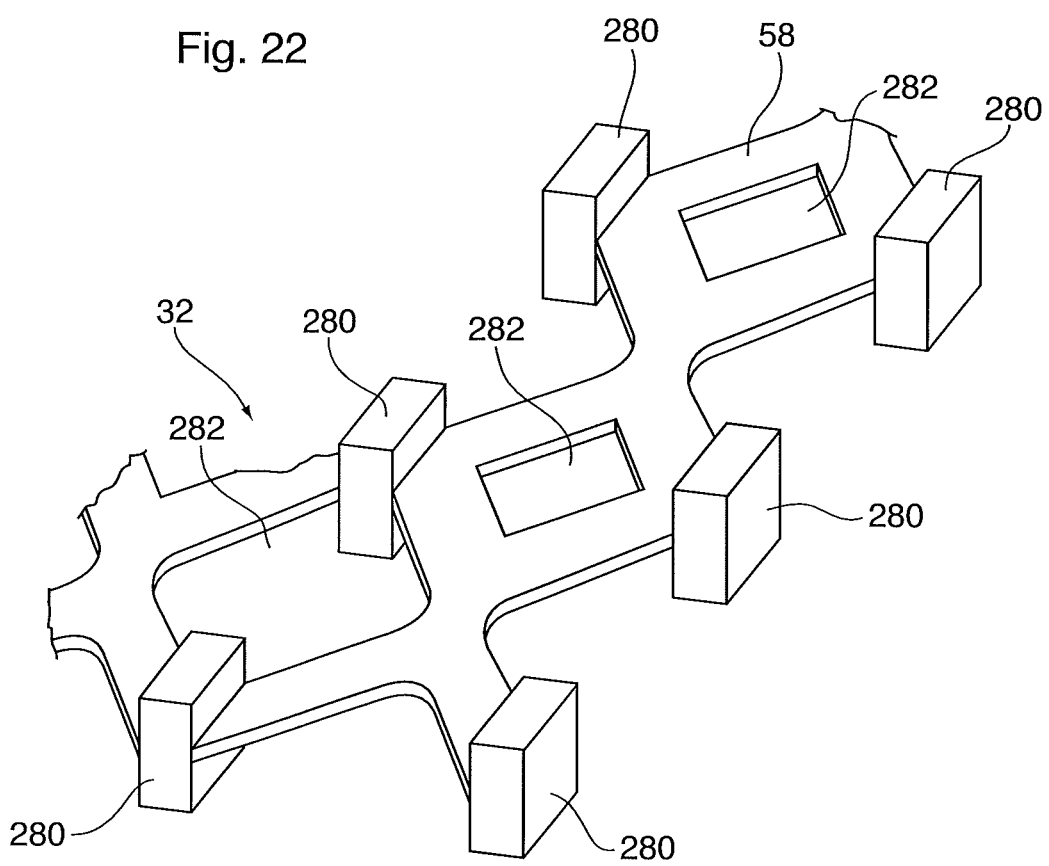

FIG. 22 shows yet another variation in the configuration of a flow field for a wet or dry humidifier plate. The variation of FIG. 22 is similar to that of FIG. 20, wherein the flow field 32 includes a plurality of rows of spaced-apart dimples 280. The web 58 in FIG. 22 has the appearance of an expanded metal mesh, and has a plurality of regularly-spaced openings 282 to provide flow communication between the top and bottom of the plate. The mesh comprising web 58 is shown as being attached to the sides of each dimple 280, thereby connecting together the rows of dimples 280. It will be appreciated that the use of a mesh-like web 58 is not restricted to this embodiment, but can be used in the embodiments discussed above in which the flow field 32 is provided with continuous ribs.

It will be appreciated that the discontinuous ribs and/or dimples described above in connection with FIGS. 20 to 22 can replace continuous ribs 28 in the wet and/or dry plates of any of the embodiments described herein. Furthermore, where such discontinuous ribs and/or dimples are incorporated into plates with wavy ribs such as wet and dry plates 314 and/or 316 of FIGS. 17 to 19, they can replace the wavy portions of ribs 28 in the central portion of flow field 32, and/or they can replace the radiating, predominantly straight portions of ribs 28 extending to the manifold openings.

Figure 23:
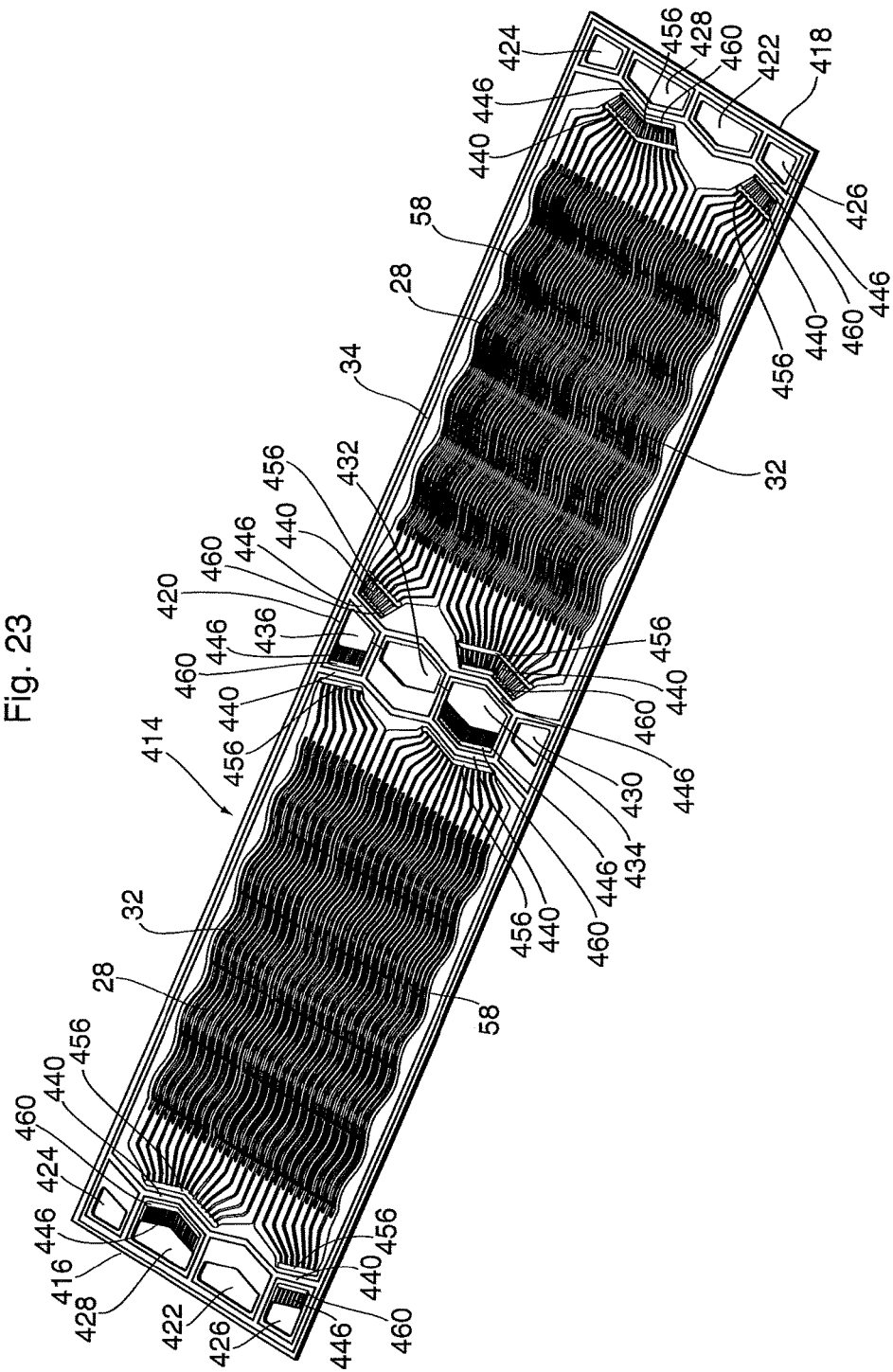
FIG. 23 is a perspective view showing one side of a plate of a humidifier according to a fifth embodiment of the invention.
Figure 24:
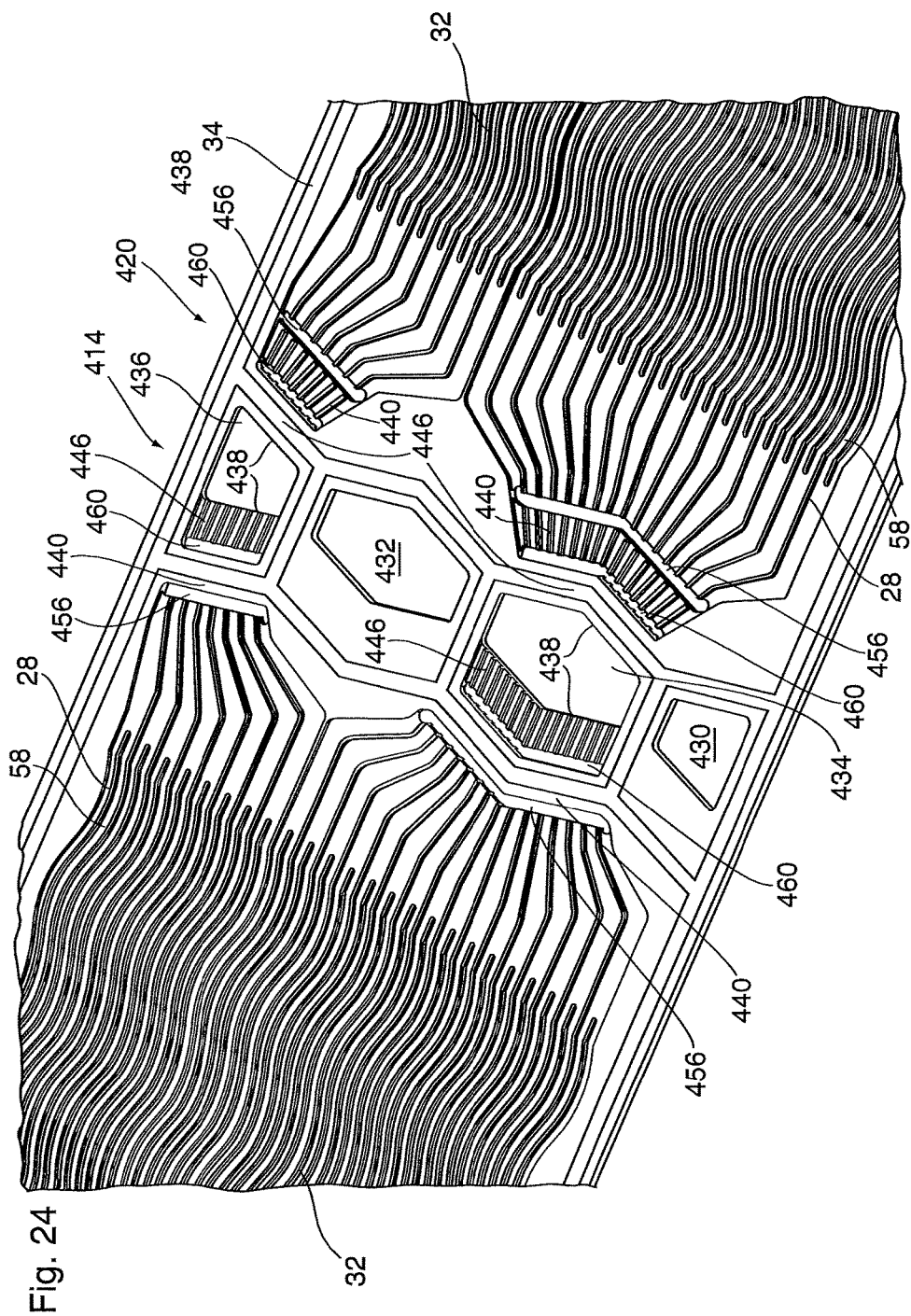
FIG. 24 is a close-up of the central portion of the plate of FIG. 23.
Figure 25:
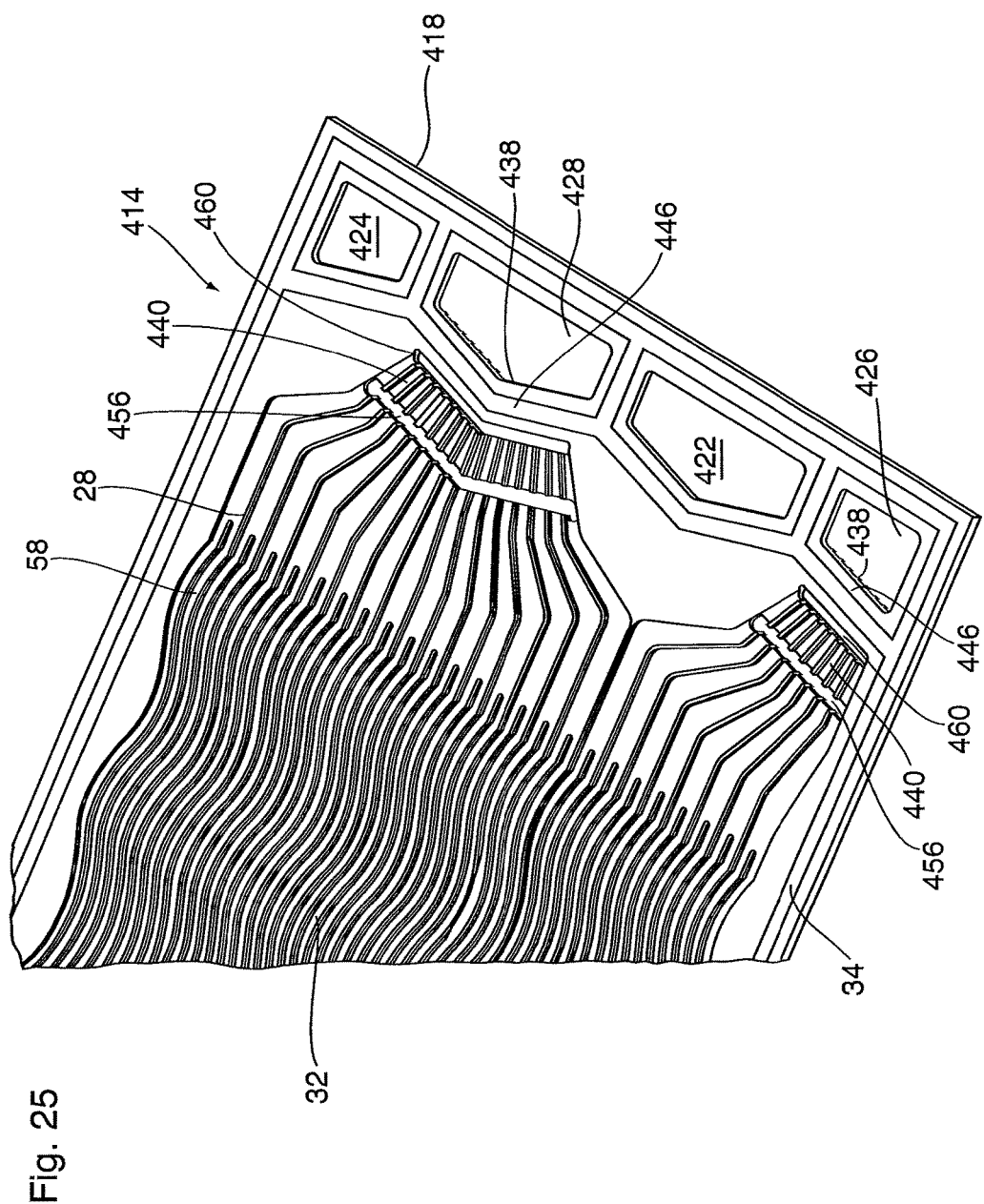
FIG. 25 is a close-up showing an end of the plate of FIG. 23.

A humidifier 410 according to a fifth embodiment of the invention is described below, in which the wet and dry gas streams are in a counter-flow or co-flow orientation relative to one another. A plate 414 of humidifier 410 is shown in FIGS. 23 to 25.

Except where noted below, the elements of humidifier 410 are identical to the elements of humidifiers 10, 210 and/or 310 described above. Therefore the description of the elements of humidifiers 10, 210 and 310 apply to humidifier 410, unless otherwise stated, and like elements of humidifier 410 are identified by like reference numerals in the drawings and in the following description. Also, FIGS. 23-25 are simplified by omitting details which are unnecessary to explain the features of this embodiment. For example, omitted from the drawings are the shallow groove 68 and compressible sealant 70, the shoulders 23, 25 to receive the diffusion layers 20, and the apertures 64 through which the plates are joined together. It will be appreciated that these elements may be present in the plates making up the humidifier according to the fifth embodiment.

Humidifier 410 comprises a core 412 which is constructed from a stack of wet plates and dry plates in alternating order. The wet and dry plates may be identical and are configured for either counterflow or co-flow of the wet and dry gas streams. One side of a plate 414 of humidifier 410 is shown in FIGS. 23-25. As in the embodiments discussed above, the opposite side of plate 414 will have a similar appearance. Plate 414 may be either a wet plate or a dry plate.

The primary differences between plate 414/humidifier 410 and the previously described embodiments is that plate 414 is formed with multiple inlet and outlet manifold openings for each of the dry and wet gas streams, and also that either the inlet or outlet openings of the plate 414 are located between the ends of the plate, and communicate with multiple inlet or outlet openings at both ends of the plate 414.

The inlet and outlet manifolds for the wet and dry gases in humidifier 410 are integrally formed with the core 412, with each plate 414 according to this embodiment including a total of twelve manifold openings for the wet and dry gas streams. In the following discussion, the plate 414 is arbitrarily described as a wet plate.

The plate 414 includes first and second ends 416, 418 and a central portion 420 located between the ends 416, 418. In this embodiment, four manifold openings are provided at each of the first end 416 and the second end 418, including two dry gas manifold openings 422, 424 and two wet gas manifold openings 426, 428. In the following description the wet gas manifold openings 426, 428 are arbitrarily described as wet gas outlet manifold openings, but they may instead be inlet manifold openings for the wet gas.

In this embodiment, four manifold openings are also provided in the central portion 420 of the plate 414, including two dry gas manifold openings 430, 432 and two wet gas manifold openings 434, 436. In the following description, the wet gas manifold openings 434, 436 in the central portion 420 of plate 414 are described as wet gas inlet openings, but they may instead be outlet openings for the wet gas.

As shown in FIGS. 23-25, the wet gas inlet manifold openings 434, 436 are in flow communication with the wet gas outlet manifold openings 426, 428 at both ends 416, 418 of the plate 414, across a flow field 32 divided by ribs 28 which are joined together by webs 58. It can be seen that the smaller manifold openings 426 at the ends 416, 418 of plate 414 are in flow communication only with the larger manifold opening 434 in the central portion 420, whereas the larger manifold openings 428 at the ends 416, 418 of plate 414 are in flow communication with both manifold openings 434, 436 in the central portion 420. However, it will be appreciated that the numbers of manifolds at the ends 416, 418 and in the central portion 420 is variable, as is the specific flow pattern between the manifolds. For example, in some embodiments, each manifold in the central portion may communicate with only one manifold at each end of the plate.

The configuration of ribs 28 in plate 414 is similar to that described above in connection with humidifier 310. In this regard, the ribs 28 of plate 414 have undulating wave-shaped central portions and angled, predominantly straight end portions communicating with the wet gas manifold openings 426, 428, 434 and 436.

The dry gas manifold openings 422, 424 at the ends 416, 418 of plate 414 and the dry gas manifold openings 430, 432 in the central portion 420 of plate 414 are simply flow through openings which are sealed around their entire peripheries and permit flow of dry gas through the plate 414 to adjacent dry humidifier plates in the core 412.

Therefore, it can be seen that the flow of wet gas to the humidifier plate 414 will initially be split into two portions, one which enters the flow field 32 through central wet gas manifold opening 434 and the other entering the flow field through central wet gas manifold opening 436. The flows from the inlet manifold openings 434, 436 are then split into two opposite directions, toward each of the ends 416, 418.

The provision of centrally located manifold openings communicating with manifold openings at the ends of plate 414 is advantageous in cases where the humidifier 410 is required to have an elongate shape. The inventors have found that there is a correlation between water flux and the length of the flow path between the inlet and outlet. Therefore, the provision of shorter flow paths provides an overall improved water flux than a plate with long flow paths. In the present embodiment, the central location of the wet gas inlet manifold openings 434, 436 and the splitting of the wet gas flow to the wet gas outlet manifold openings 426, 428 at the ends 416, 418 of plate 414 effectively divides the relatively long plate 414 into two shorter plates with shorter flow paths, each extending from the central portion 420 to one of the ends 416 or 418. It will be appreciated that it may not be necessary to locate the manifold openings 434 and for 436 centrally. Rather, one or more of the manifold openings provided between the ends of the plates may be located closer to one end than to the other end.

The provision of multiple inlet manifold openings and multiple outlet manifold openings across the width of plate 414 allows for a more uniform distribution of gas flow across the width of the plate 414, maximizes the area of the flow field 32, and the more rectangular shape of the flow field 32 and manifold openings results in less waste of the membrane 18 and gas diffusion layers 20, which are trimmed to fit the shape of the flow field 32. These advantages can be appreciated by comparing plate 414 with the plates 314 and 316 shown in FIGS. 17A-B and 18A-B. It will be appreciated that the configuration of plate 414 can be altered so that it has more than two centrally located wet gas inlet manifold openings communicating with a corresponding number of wet gas outlet manifold openings located at each end 416, 418 of the plate 414. Alternatively, the configuration of plate 414 can be altered so that it has only one centrally located wet gas inlet manifold opening, communicating with a one wet gas outlet manifold opening located at each end 416, 418 of the plate 414.

As in the previously described embodiments, the inlet and outlet openings through which the wet gas flows between the flow field 32 and manifold openings 426, 428, 434 and 436 are provided in edge surfaces of the plate 414, wherein these edge surfaces (identified by 438 in FIGS. 24 and 25) are provided in the edges of the wet gas manifold openings 426, 428, 434 and 436. As shown in the drawings, each of the centrally located wet gas inlet manifold openings has two such edge surfaces 438.

Also, it can be seen that the plate 414 includes offset bridging portions 440, 446 at each of the wet gas manifold openings 426, 428, 434 and 438, with each of the central manifolds 434 and 436 including a pair of bridging portions 440 and a pair of bridging portions 446. In addition, dive-through openings 456, 460 are provided at both ends of each bridging portion 440, 446, to permit the wet gas flow to pass under or over each of the bridging portions between the edge surfaces 438 and the flow fields 32, and to permit flow communication between the top and bottom surfaces of plate 414.

Plate 414 also includes a sealing surface 34 extending continuously around the outer edges of flow field 32, and across bridging portions 440, 446 as in the previously described embodiments. This arrangement allows a continuous seal to be provided along the top and bottom of plate 414 while allowing the wet gas stream to flow from the inlet manifold openings 434, 436 to the outlet manifold openings 426, 428. A corresponding sealing surface 44 (not shown) is located on the opposite side of plate 414, as in the previously described embodiments.

Figure 26:
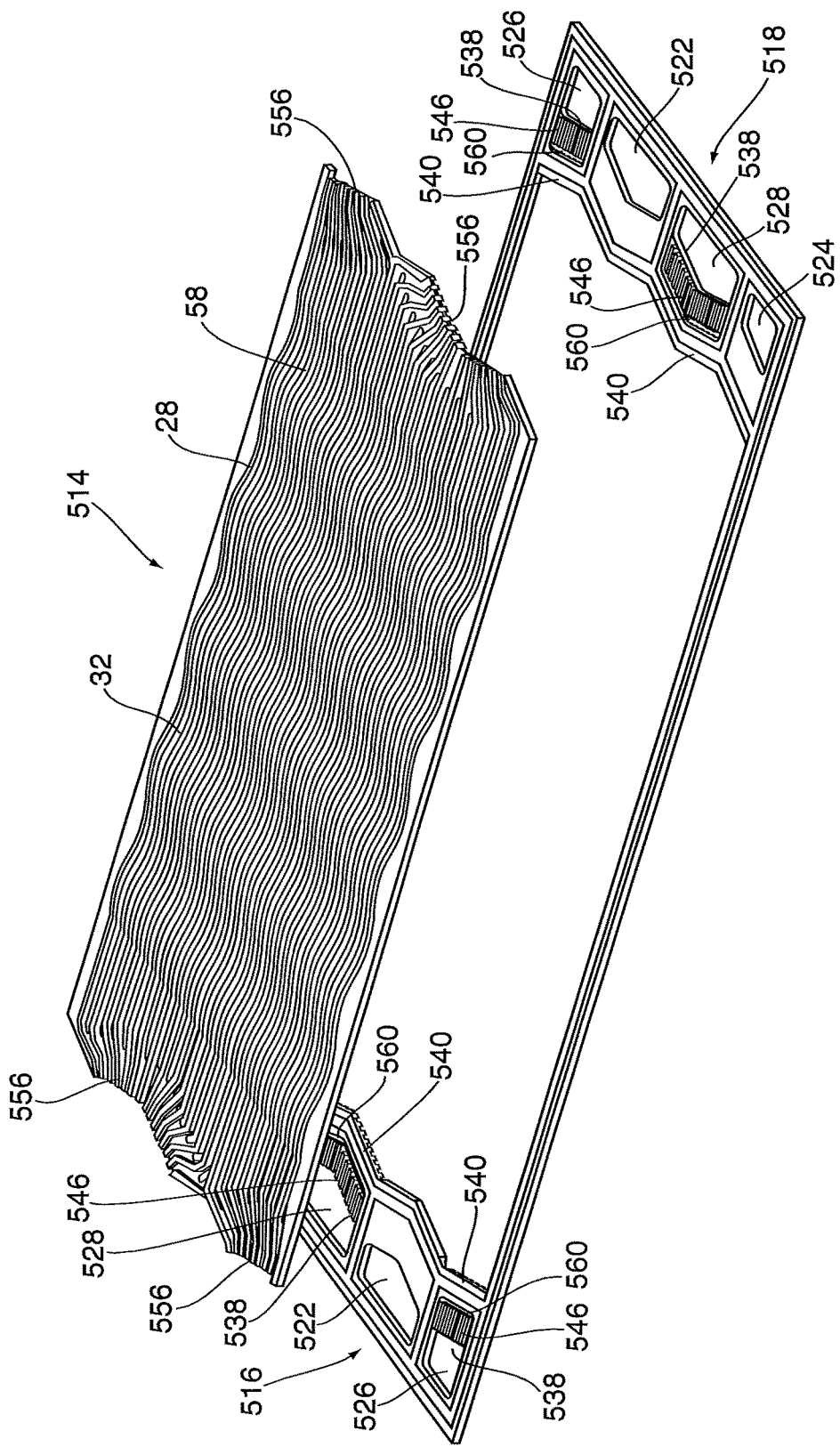
FIG. 26 is an exploded perspective view of a plate of a humidifier according to a sixth embodiment of the invention.

A humidifier 510 according to a sixth embodiment of the invention is described below. Humidifier 510 comprises a core 512 which is constructed from a stack of wet plates and dry plates in alternating order. The wet and dry plates may be identical and are configured for either counterflow or co-flow of the wet and dry gas streams. One side of a plate 514 of humidifier 510 is shown in FIG. 26. As in the embodiments discussed above, the opposite side of plate 514 will have a similar or identical appearance. Plate 514 may be either a wet plate or a dry plate, but is described below as a wet plate.

Except where noted below, the elements of humidifier 510 are identical to the elements of humidifiers 10, 210, 310 and/or 410 described above. Therefore the description of the elements of humidifiers 10, 210, 310 and 410 apply to humidifier 510, unless otherwise stated, and like elements of humidifier 510 are identified by like reference numerals in the drawings and in the following description. Also, FIG. 26 is simplified by omitting details which are unnecessary to explain the features of this embodiment. For example, omitted from the drawings are the shallow groove 68 and compressible sealant 70, the shoulders 23, 25 to receive the diffusion layers 20, and the apertures 64 through which the plates are joined together. It will be appreciated that these elements may be present in the plates 514.

The inlet and outlet manifolds for the wet and dry gases in humidifier 510 are integrally formed with the core 512. As in plate 414 described above, the plate 514 is provided with multiple inlet and outlet manifold openings for each of the dry and wet gas streams. In this regard, plate 514 has first and second ends 516, 518, with four manifold openings provided at each end 516, 518, including two dry gas manifold openings 522, 524 and two wet gas manifold openings 526, 528. The manifold openings 522, 524, 526 and 528 of plate 514 may have similar or identical configurations to manifold openings 422, 424, 426 and 428 of plate 414 described above.

The wet gas manifold openings 526, 528 at one end 516 of plate 514 are in flow communication with the wet gas manifold openings 526, 528 at the opposite end 518 of plate 514 across a flow field 32 divided by ribs 28 which are joined together by webs 58. The ribs 28 of plate 514 have undulating wave-shaped central portions and angled, predominantly straight end portions communicating with the wet gas manifold openings 526, 528 at the ends 516, 518 of plate 514. The dry gas manifold openings 522, 524 are simply flow through openings which are sealed around their entire peripheries and permit flow of dry gas through the plate 514 to adjacent dry humidifier plates in the core 512.

As in the arrangement provided at the ends 416, 418 of plate 414 described above, plate 514, the openings through which the wet gas flows between the flow field 32 and wet gas manifold openings 526, 528 are defined in edge surfaces 538 of openings 526, 528. Plate 514 further comprises offset bridging portions 540, 546 and dive-through openings 556, 560 at each of the wet gas manifold openings 526, 528 to permit the wet gas flow to pass under or over each of the bridging portions 540, 546 between the edge surfaces 538 and the flow field 32, and to permit flow communication between the top and bottom surfaces of plate 514.

In the embodiments described above, each of the wet and dry plates making up the core are described as being integrally formed from a single plate or sheet of material. However, plate 514 comprises a separately formed central portion 530 and perimeter portion 532. The central portion 530 comprises the flow field 32 or a portion thereof, and is separately formed from the surrounding perimeter portion 532, such that the plate 514 comprises an assembly of the central portion 530 and the perimeter portion 532. A joint 534 between the central portion 530 and the perimeter portion 532 is located inwardly of the top and bottom sealing surfaces 34, 44 of the plate 514, and spaced therefrom. Only the top sealing surface 34 is shown in FIG. 26, it being appreciated that the bottom sealing surface 44 will have a similar or identical configuration.

In the illustrated embodiment, the central portion 530 comprises the entire flow field 32 or a substantial portion thereof, and the joint 534 between the central portion 530 and the perimeter portion 532 is located immediately inwardly of the top sealing surface 34, and more particularly is located immediately inwardly of the two bridging portions 540, 546 and dive-through opening 560. In this embodiment, the joint 534 passes through the dive-through opening 556.

The formation of plate 514 from separately formed central and perimeter portions 530, 532 permits added flexibility in the configuration of the flow field, and in the choice of materials from which the central portion 530 is formed. For example, rather than having a regular rib pattern as shown in FIG. 26, the central portion 530 may be comprised of a porous material which permits flow between the ends 516, 518 of plate 514, while also being sufficiently rigid to support the membrane 18 and the gas diffusion layer(s) 20.

The porous material of central portion may comprise a rigid or semi-rigid fibrous material comprising a network, fabric or mesh of woven or non-woven fibres, or the porous material may comprise a rigid or semi-rigid foam material having a network of open cells. FIG. 27 shows a close-up of a portion of a flow field 32 of a humidifier plate 514, in which the flow field 32 is formed from a porous material 550. It can be seen that the formation of the flow field 32 from such a porous material will permit flow of the wet gas between the ends 516, 518 of plate 514, and will also permit open communication between the top and bottom surfaces of the plate 514.

It will be appreciated that construction of humidifier plates from separate central and perimeter portions 530, 532 and/or the use of a porous material in the flow field 32 are not restricted to plate 514 described above, but can be applied to any of the embodiments described herein. Furthermore, it will be appreciated that the use of a porous flow field 32 is not restricted to embodiments where the plate is constructed from separately formed from a central portion and a perimeter portion. For example, porous flow fields may be used in embodiments where the plates are integrally formed from a single piece of material.

Although the invention has been described with reference to certain preferred embodiments, it is not limited thereto. Rather, the invention includes all embodiments which may fall within the scope of the following claims.

What is claimed is:

1. A humidifier for transferring water vapour from a first gas stream to a second gas stream, the humidifier comprising:
   (a) a plurality of plates arranged in a stack, each of said plates defining a gas flow passage for either said first gas stream or said second gas stream, wherein each of said plates comprises:
      (i) a top, a bottom and a thickness measured between said top and bottom;
      (ii) an inlet opening along an edge surface of the plate;
      (iii) an outlet opening along an edge surface of the plate;
      (iv) a flow field defined in a central portion of the plate, the flow field having an open top along the top of the plate and an open bottom along the bottom of the plate;
      (v) an inlet passage connecting said inlet opening to the open top and the open bottom of said flow field;
      (vi) an outlet passage connecting the open top and the open bottom of said flow field to said outlet opening;
      (vii) a planar top sealing surface extending along the top of the plate, wherein the top sealing surface extends continuously around the flow field, and includes bridging portions extending across the inlet passage and the outlet passage;
      (viii) a planar bottom sealing surface extending along the bottom of the plate, wherein the bottom sealing surface extends continuously around the flow field, and includes bridging portions extending across the inlet passage and the outlet passage;
      (ix) a plurality of support structures located within the flow field and extending between the top and bottom of the plate;
      wherein pairs of said plates are sealed together in said stack with the top sealing surface of one plate sealed to the bottom sealing surface of an adjacent plate;
   (b) a plurality of water permeable membranes, wherein one of said membranes is provided between each pair of adjacent plates in said stack, and is sealed to said pair of adjacent plates, and wherein said support structures provide support for said water permeable membranes within the flow fields;
   (c) a plurality of manifolds for said first gas stream and a plurality of manifolds for said second gas stream, wherein each of said manifolds for said first gas stream is in flow communication with a first plurality of said plates defining said gas flow passages for said first gas stream, and wherein each of said manifolds for said second gas stream is in flow communication with a second plurality of said plates defining said gas flow passages for said second gas stream;
   wherein said plates are stacked and said manifolds are arranged such that the gas flow passages for said first gas stream alternate with the gas flow passages for said second gas stream throughout said stack, and such that each of the water permeable membranes separates one of the gas flow passages for the first gas stream from one of the gas flow passages for the second gas stream;
   wherein the plurality of support structures located within the flow field of each of the plates comprises a plurality of ribs; and
   wherein each of the ribs has an undulating wave shape in a central portion thereof.

2. The humidifier of claim 1, wherein the plurality of ribs together form an undulating wave pattern in the flow field.

3. The humidifier of claim 2, wherein the undulating wave pattern in the flow field of one of said plates is out of phase with the undulating wave pattern in the flow field of an adjacent one of said plates, such that the central portions of the ribs in said two plates form a criss-crossing pattern with one another.

4. The humidifier of claim 1, wherein each of the ribs includes a pair of end portions, each of the end portions being located between the central portion of the rib and one of the inlet or outlet openings, wherein the end portions are angled relative to a direction of gas flow across the plate.

5. The humidifier of claim 4, wherein the end portions of each of the ribs are predominantly straight.

6. The humidifier of claim 4, wherein the end portions of each of the ribs radiate away from the manifolds and from the inlet and outlet openings.

7. The humidifier of claim 4, wherein the end portions of the ribs in one of said plates form a criss-crossing pattern with the end portions of the ribs in an adjacent one of said plates.

8. The humidifier of claim 1, wherein said plurality of manifolds includes at least one inlet manifold and at least one outlet manifold for said first gas stream, and at least inlet manifold and at least one outlet manifold for said second gas stream;
   wherein each of the plates has first and second opposed ends at which the manifolds are located; and
   wherein the inlet manifold and the outlet manifold for the first gas stream are located at respective first and second ends of the plates.

9. The humidifier of claim 8, wherein the gas flow passages for the first gas stream and the second gas stream are in a co-flow arrangement or a counter-flow arrangement.

10. The humidifier of claim 1, wherein each of said first and second pairs of manifolds are integrally formed with the plates, with each of the plates being provided with at least four integral manifold openings which are enclosed within outer peripheral edges of the plates, and wherein at least two of said manifold openings in each said plate are in flow communication with the gas flow passage defined by that plate.

11. The humidifier of claim 2, wherein each of said plates has two of said undulating wave patterns formed by the central portions of the ribs, a first undulating wave pattern along the top of each plate and a second undulating wave pattern along the bottom of each said plate, and wherein the first and second undulating wave patterns are out of phase with one another, such that a criss-crossing pattern is formed by the first and second undulating wave patterns within each of said plates.

12. The humidifier of claim 10, wherein each of the plates is provided with at least four integral manifold openings which are enclosed within outer peripheral edges of the plates, and wherein two of said manifold openings in each said plate are in flow communication with the gas flow passage defined by that plate.

13. The humidifier of claim 1, wherein said plurality of manifolds includes at least two inlet manifolds and at least two outlet manifolds for said first gas stream and/or said second gas stream.

14. The humidifier of claim 1, wherein said plurality of manifolds includes at least two inlet manifolds and at least two outlet manifolds for said first gas stream and at least two inlet manifolds and at least two outlet manifolds for said second gas stream, wherein each of the inlet manifolds for the first gas stream is in flow communication with at least one of the outlet manifolds for the first gas stream, and wherein each of the inlet manifolds for the second gas stream is in flow communication with at least one of the outlet manifolds for the second gas stream.

15. The humidifier of claim 1, wherein the humidifier has first and second opposed ends;
wherein the plurality of manifolds includes at least one manifold located intermediate the ends of the humidifier, said at least one manifold being in flow communication with one of said manifolds at the first end of the humidifier and one of said manifolds at the second end of the humidifier.

16. The humidifier of claim 15, wherein the at least one manifold located intermediate the ends of the humidifier is located in a central portion of the humidifier.

17. The humidifier of claim 1, wherein at least some of said plates comprise a central portion and a surrounding perimeter portion, said central portion comprising at least a portion of the flow field, and wherein the central portion and the peripheral portion are separately formed, such that each of said plates comprises an assembly of the central portion and the perimeter portion.

18. The humidifier of claim 17, wherein a joint between the central portion and the perimeter portion will be located inwardly of the top and bottom sealing surfaces of the plate.

* * * * *